May 7, 1957 R. W. VOSE 2,791,469
MACHINE AND METHOD FOR MAKING TWISTED BRUSHES
Filed Dec. 13, 1952 14 Sheets-Sheet 1
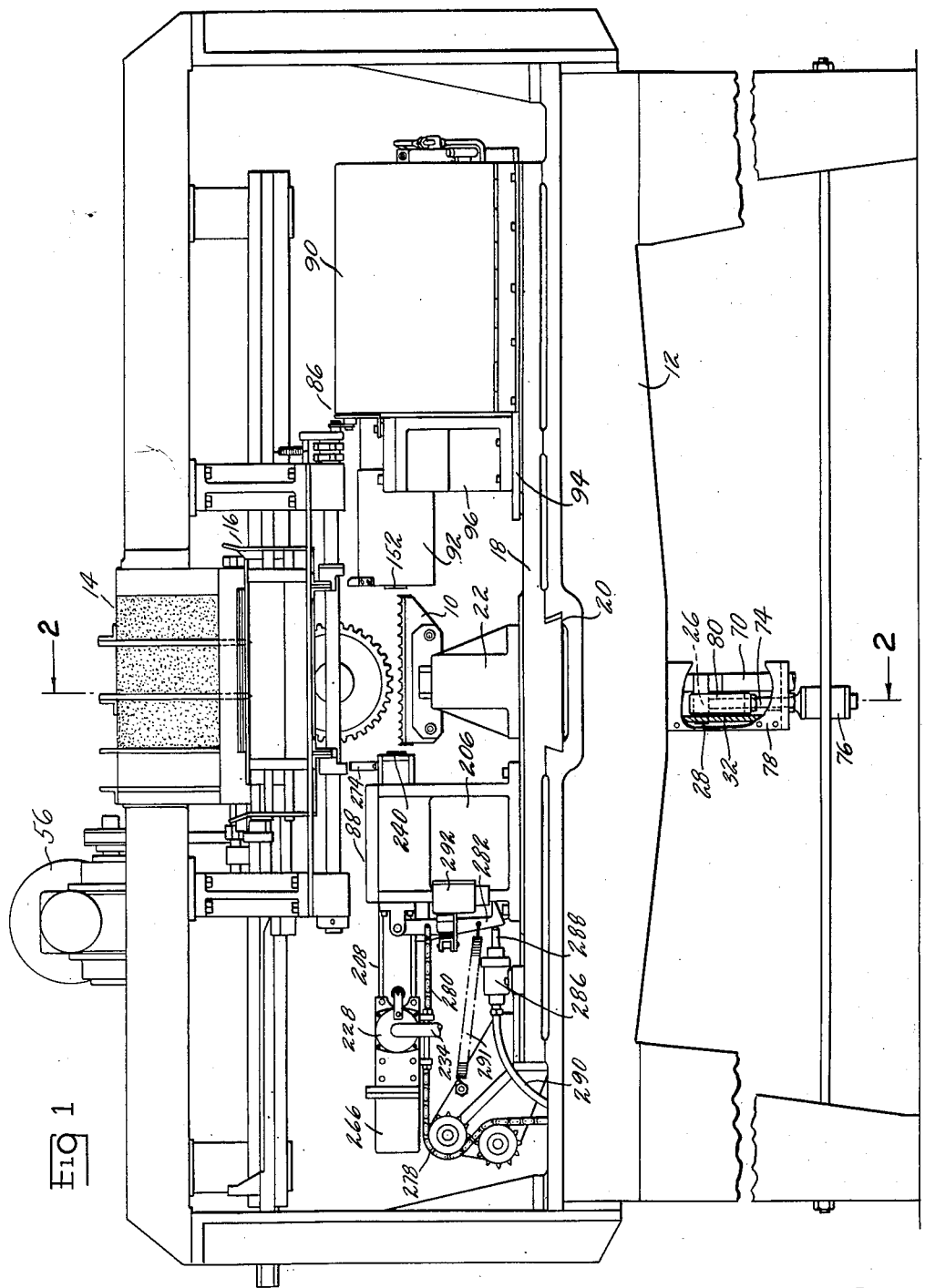
INVENTOR
ROBERT W. VOSE
BY
ATTORNEY

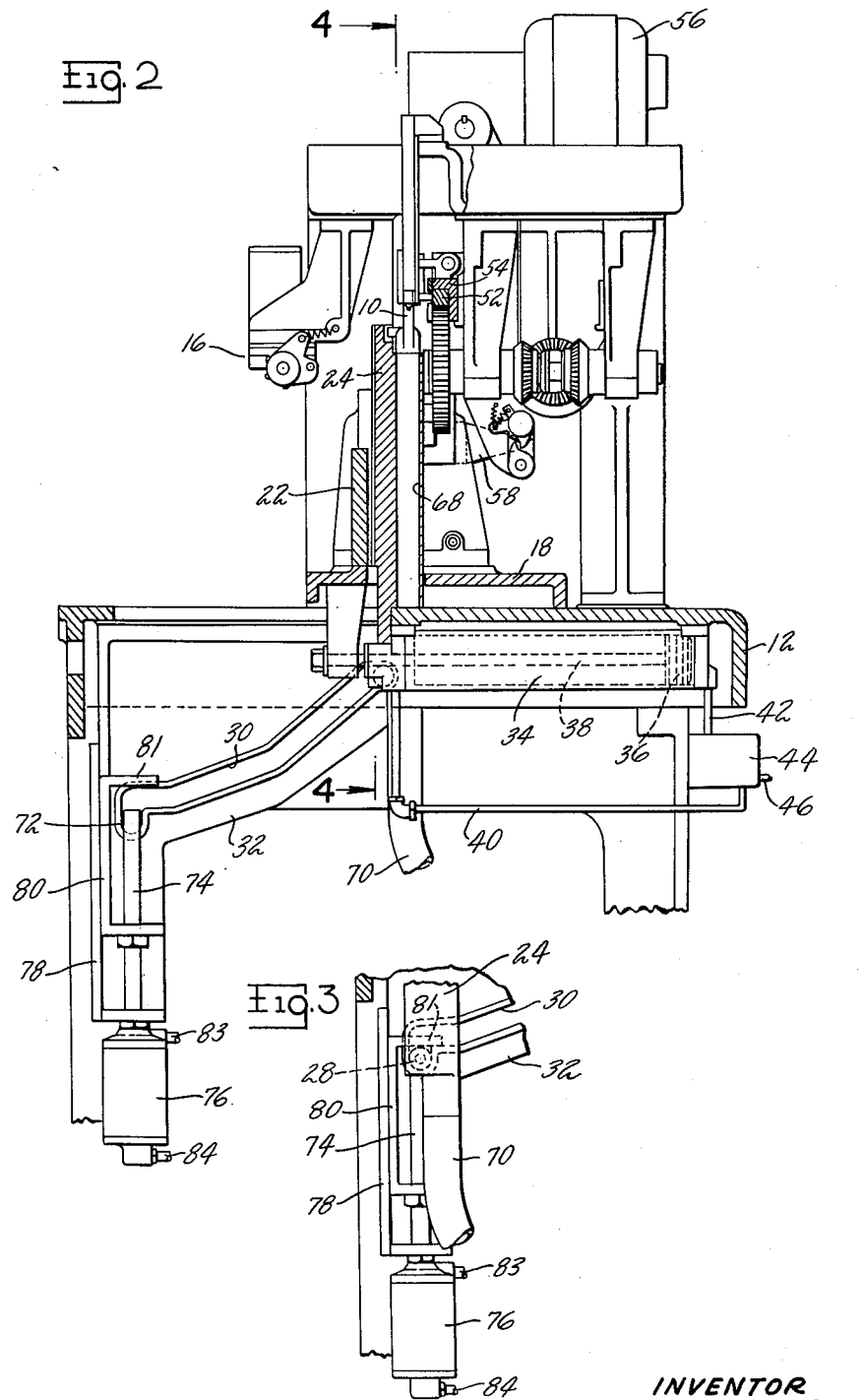

May 7, 1957   R. W. VOSE   2,791,469
MACHINE AND METHOD FOR MAKING TWISTED BRUSHES
Filed Dec. 13, 1952   14 Sheets-Sheet 3

INVENTOR
ROBERT W. VOSE
BY J. Jay Teller
ATTORNEY

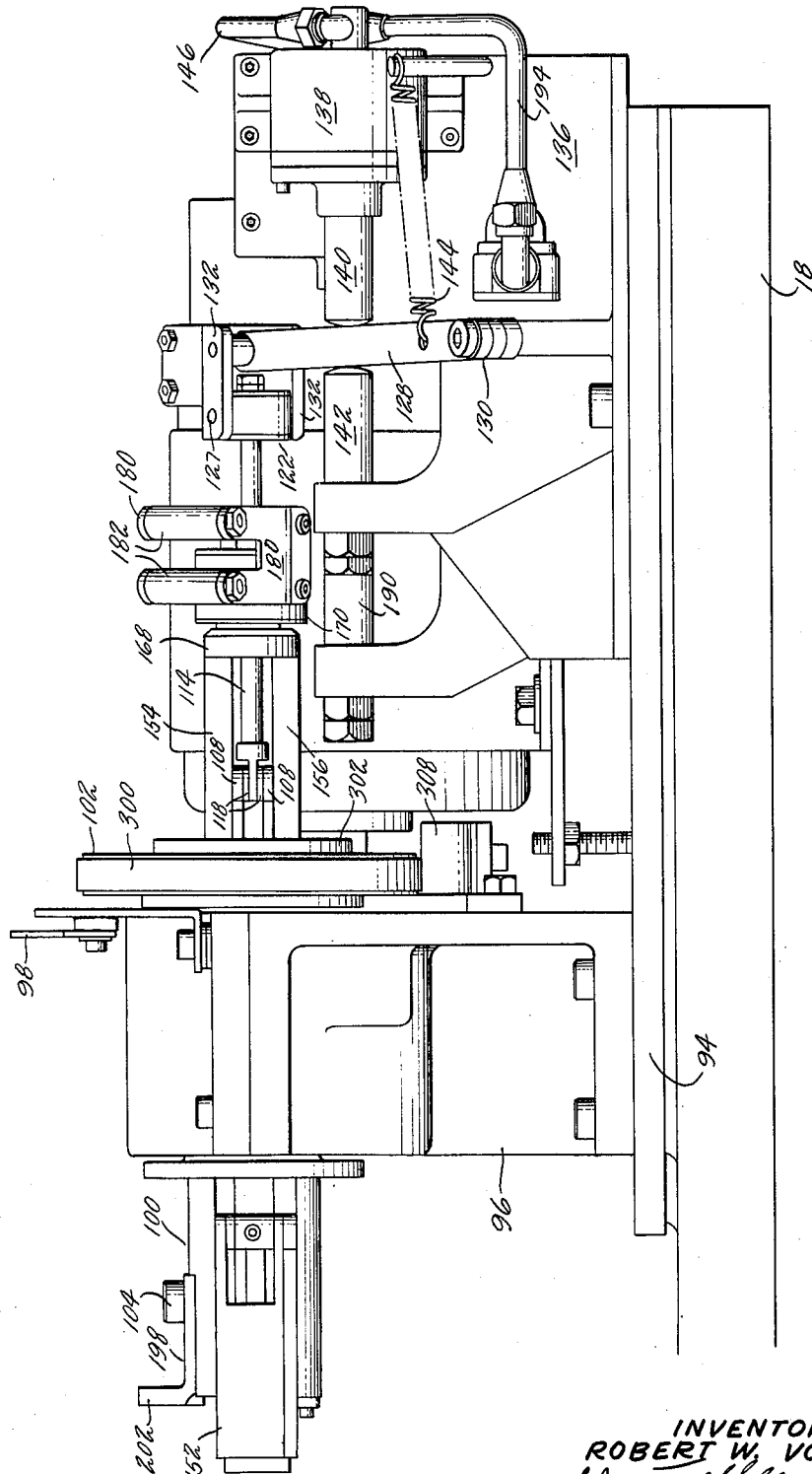

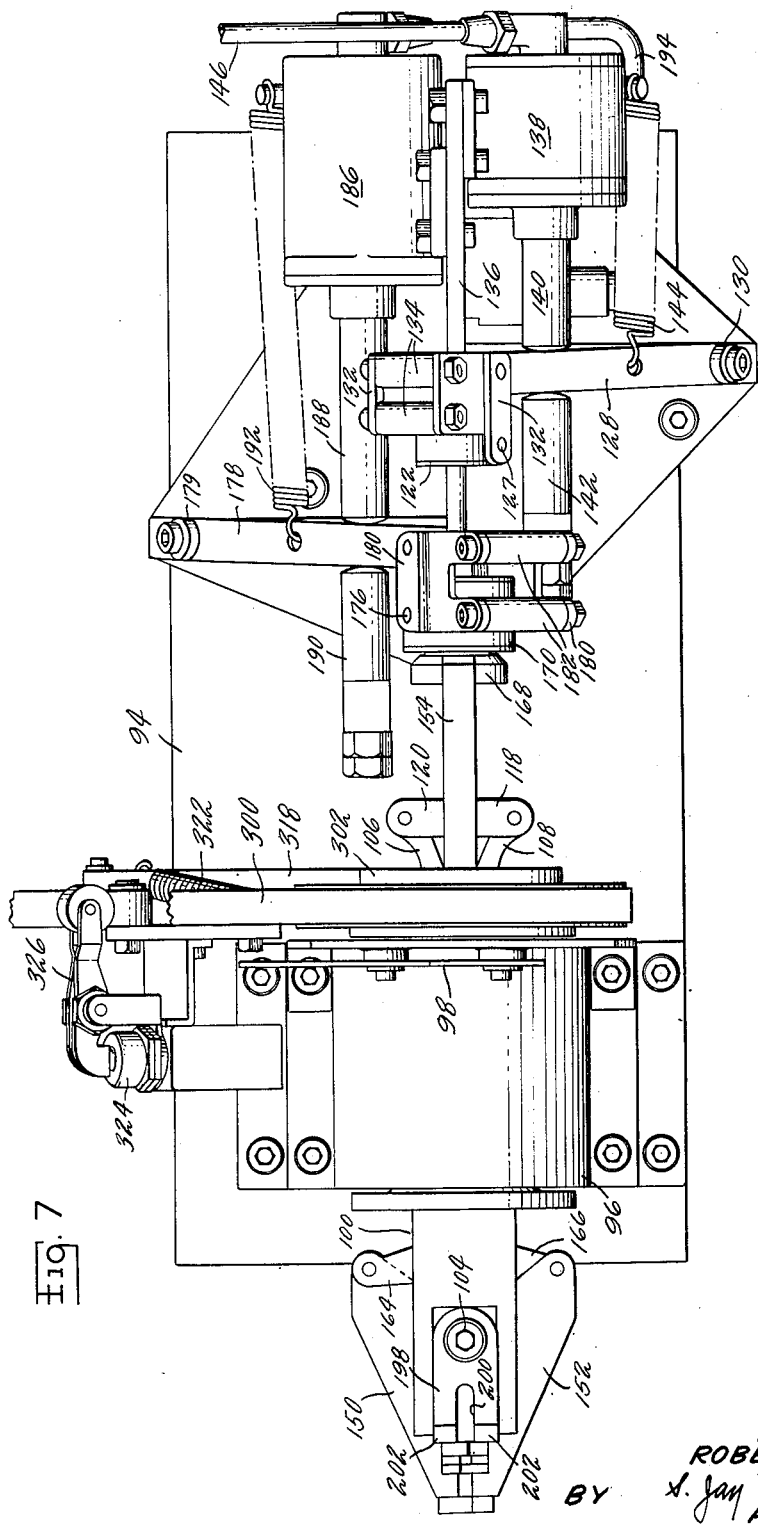

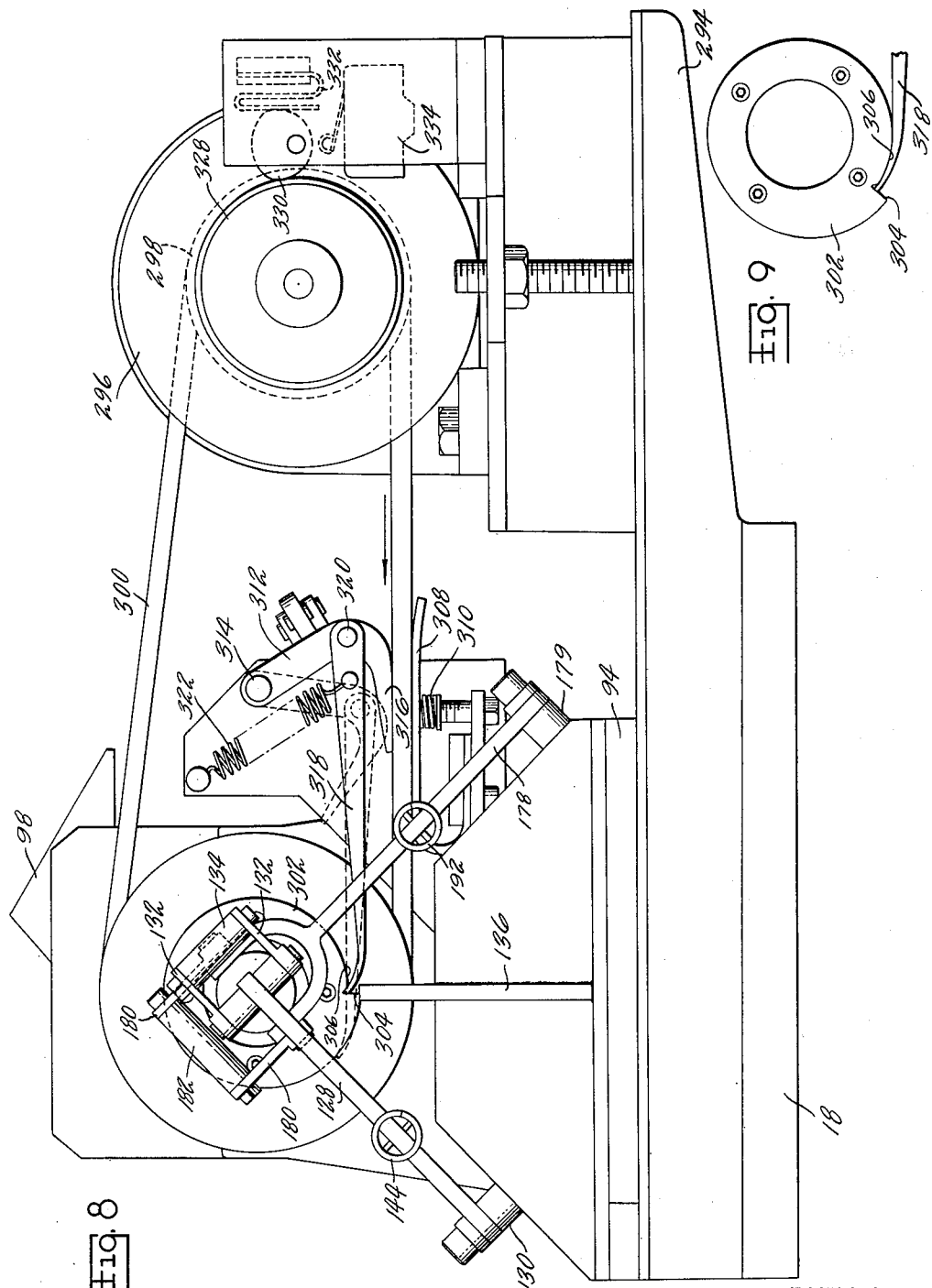

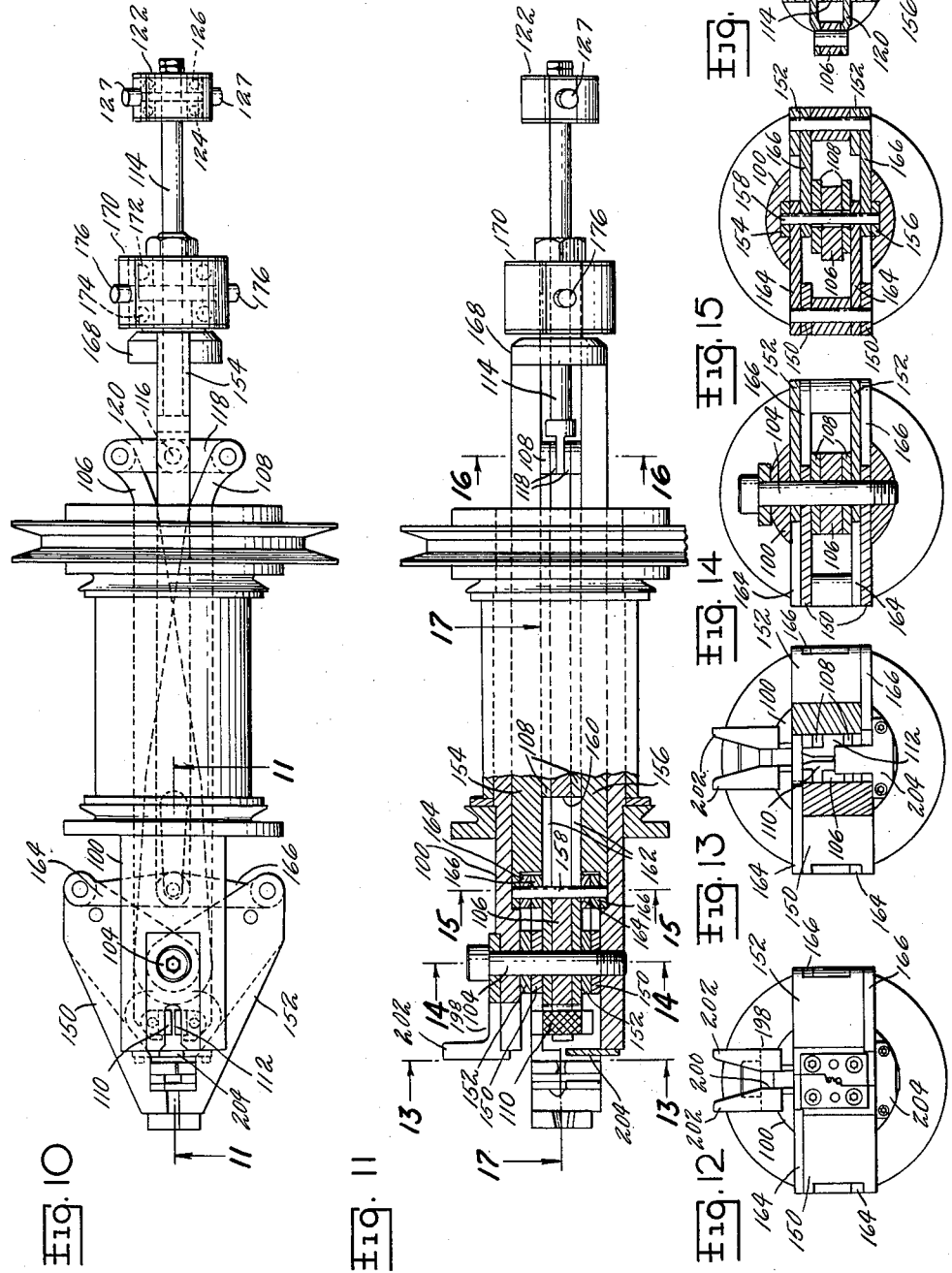

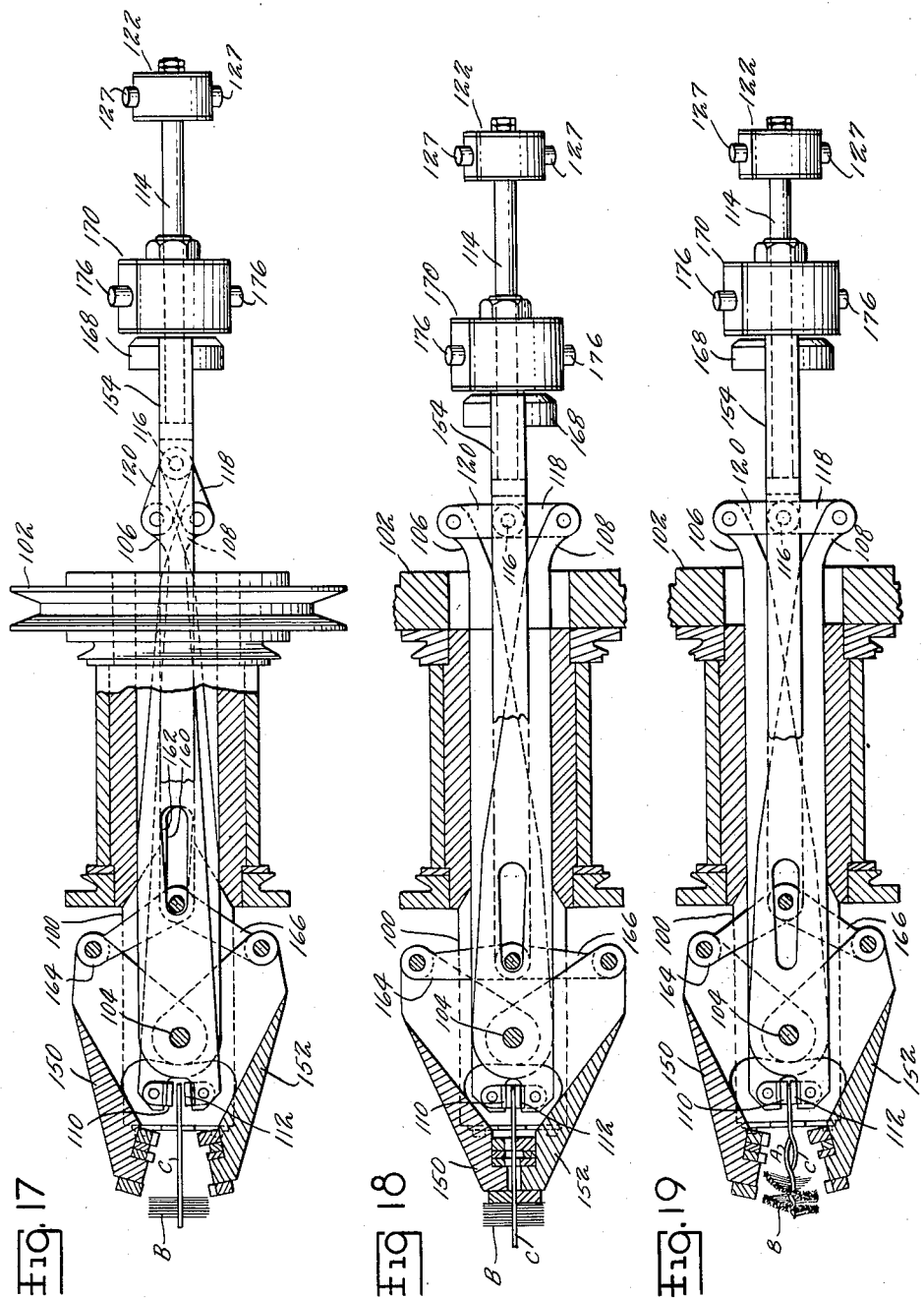

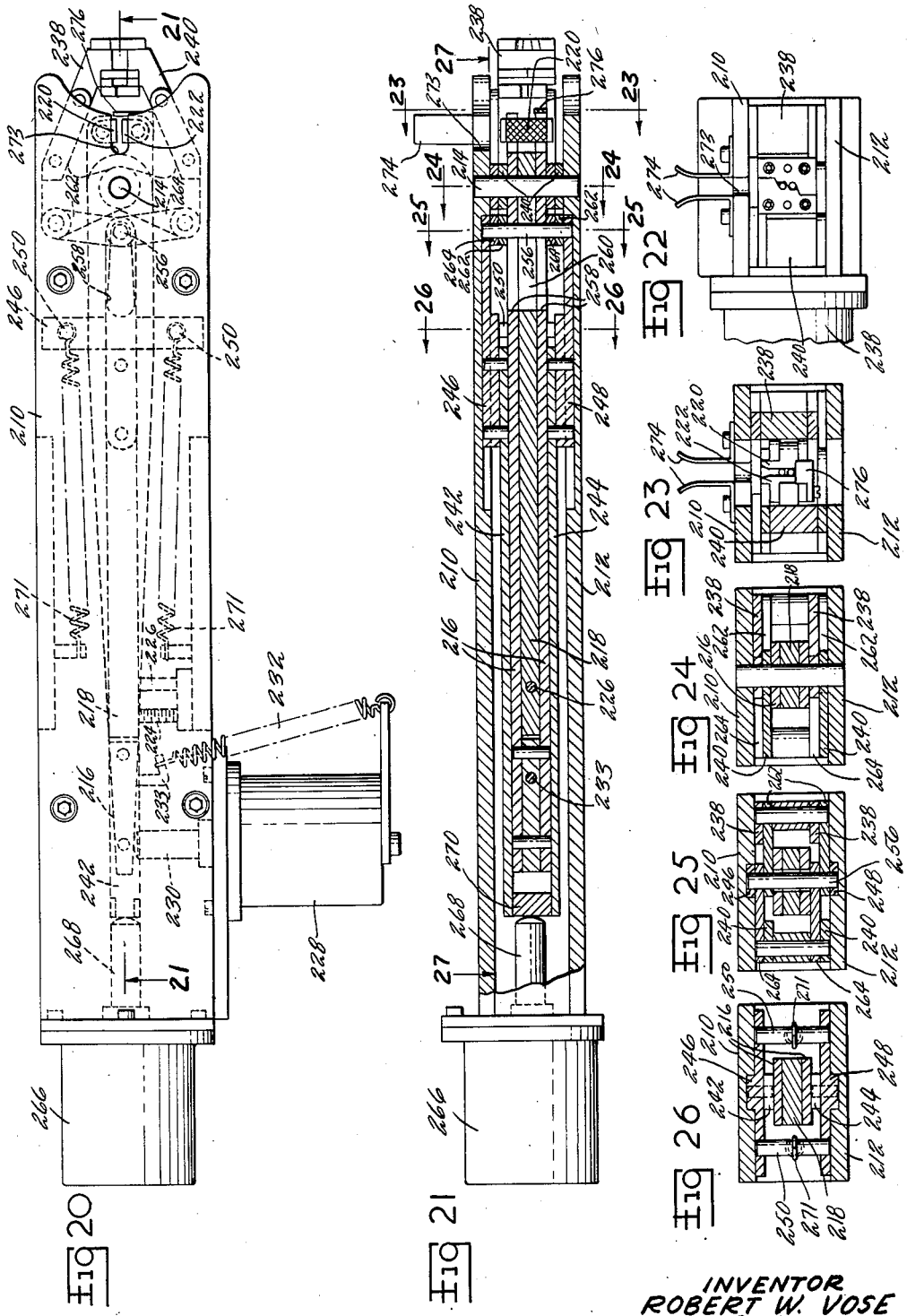

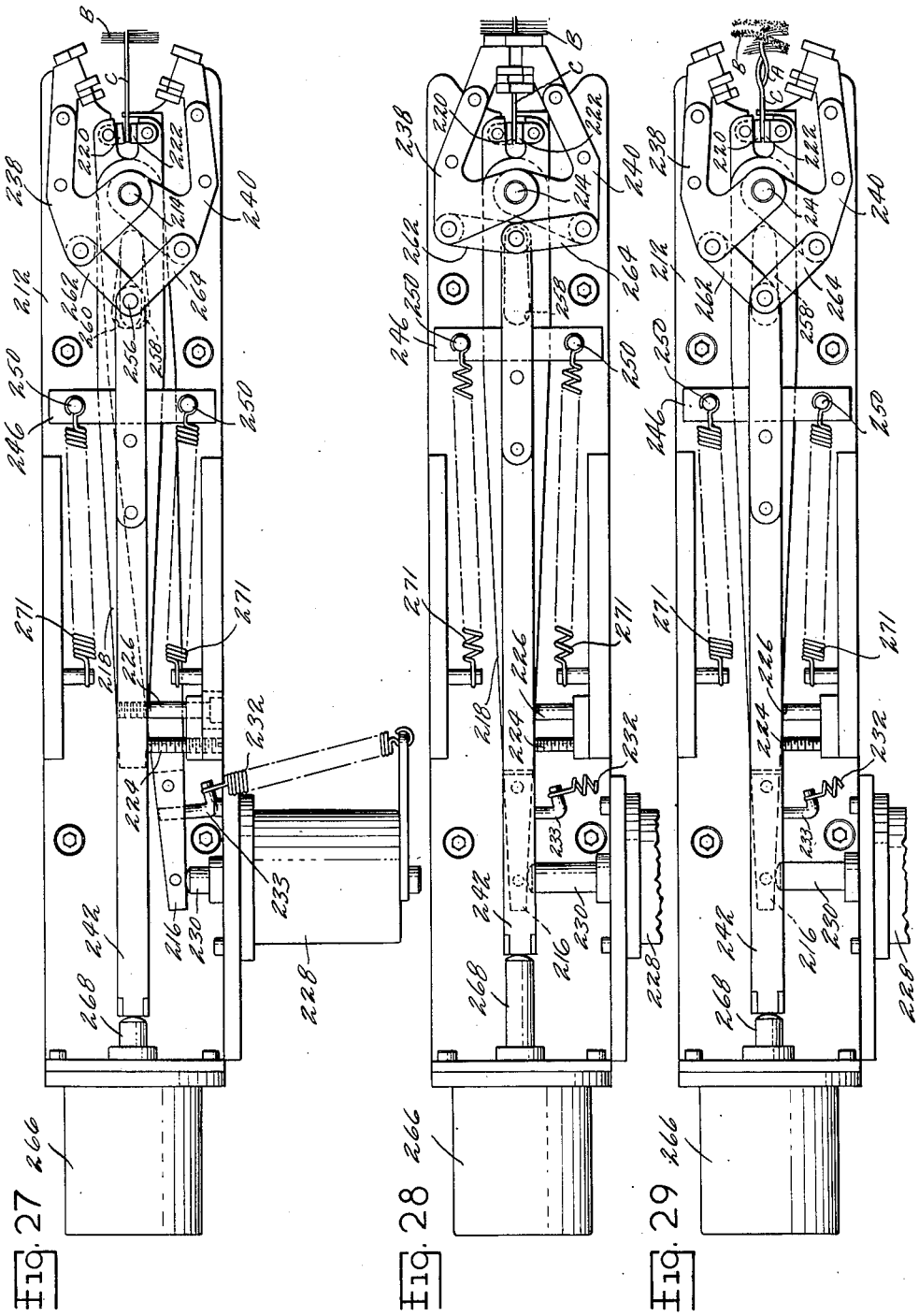

May 7, 1957    R. W. VOSE    2,791,469
MACHINE AND METHOD FOR MAKING TWISTED BRUSHES
Filed Dec. 13, 1952    14 Sheets-Sheet 11
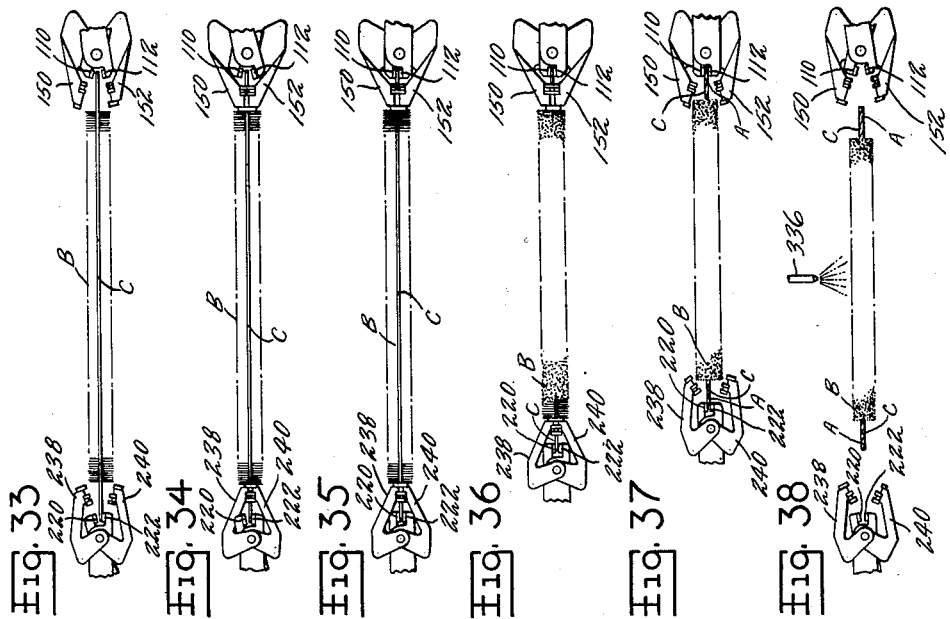
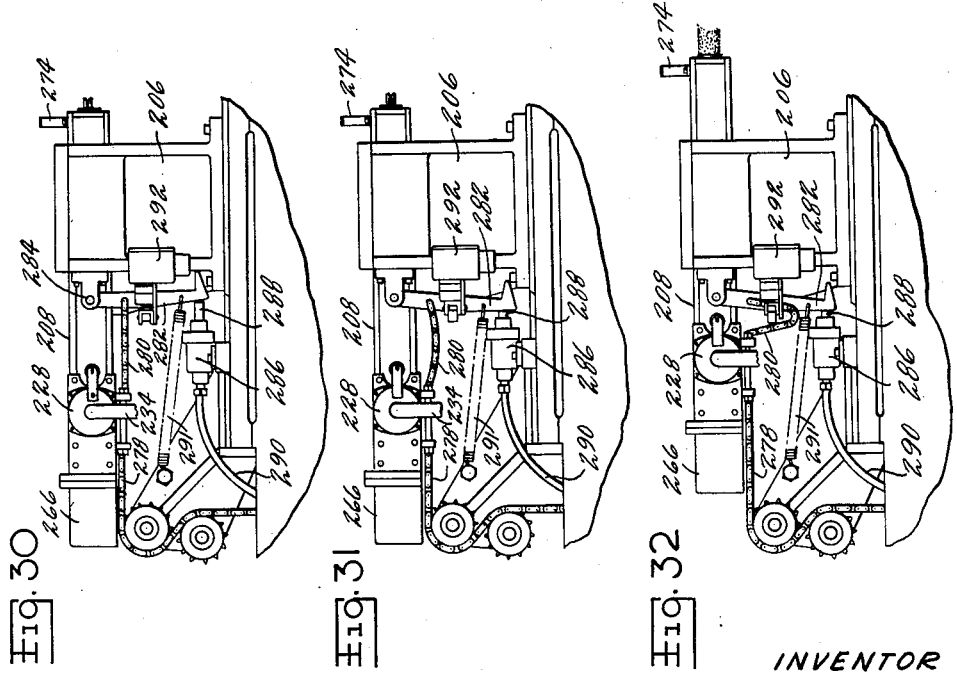
INVENTOR
ROBERT W. VOSE
BY S. Jay Tiller
ATTORNEY

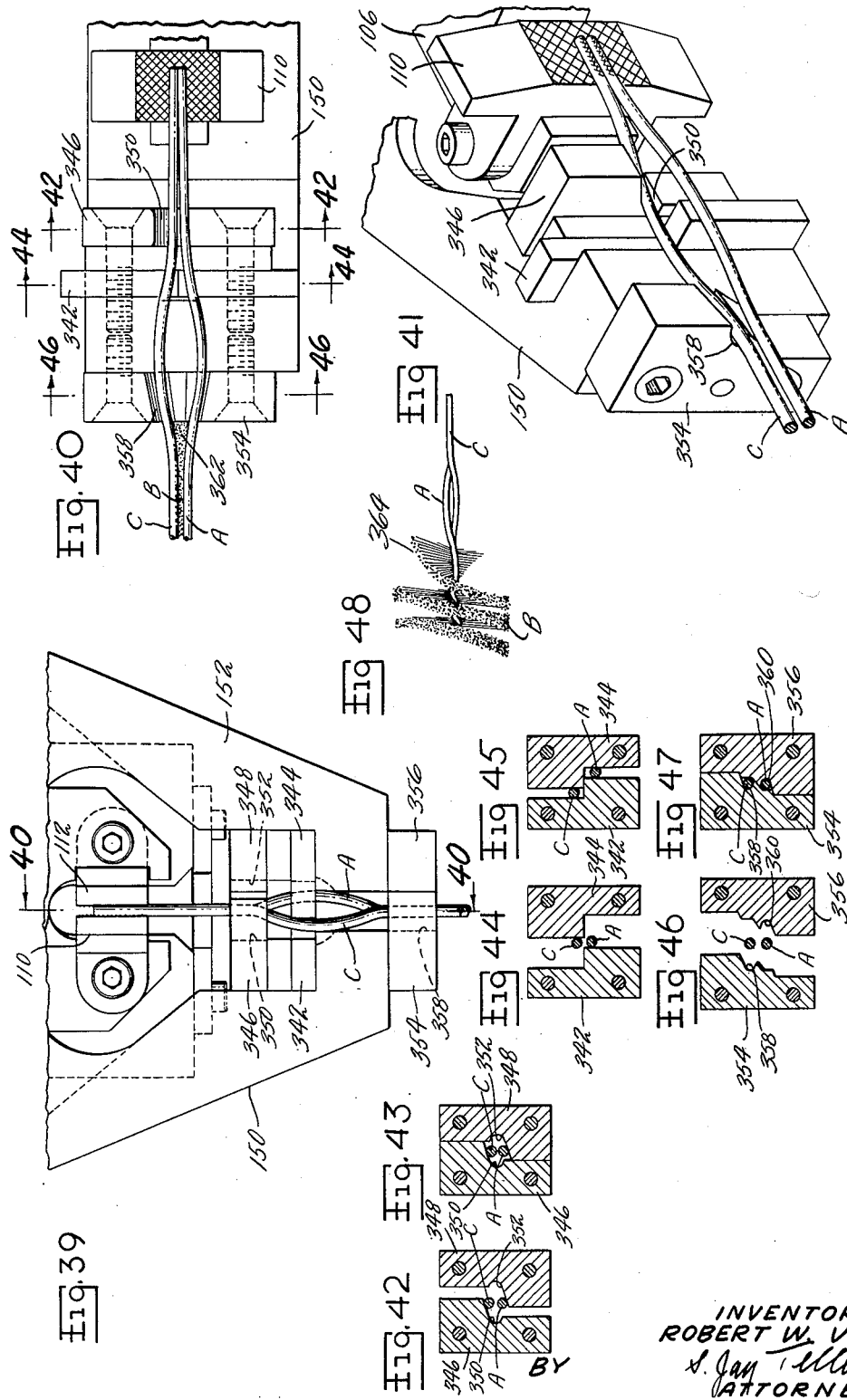

May 7, 1957               R. W. VOSE               2,791,469

MACHINE AND METHOD FOR MAKING TWISTED BRUSHES

Filed Dec. 13, 1952                     14 Sheets-Sheet 13

INVENTOR
ROBERT W. VOSE
BY    H. Jay Teller
         ATTORNEY

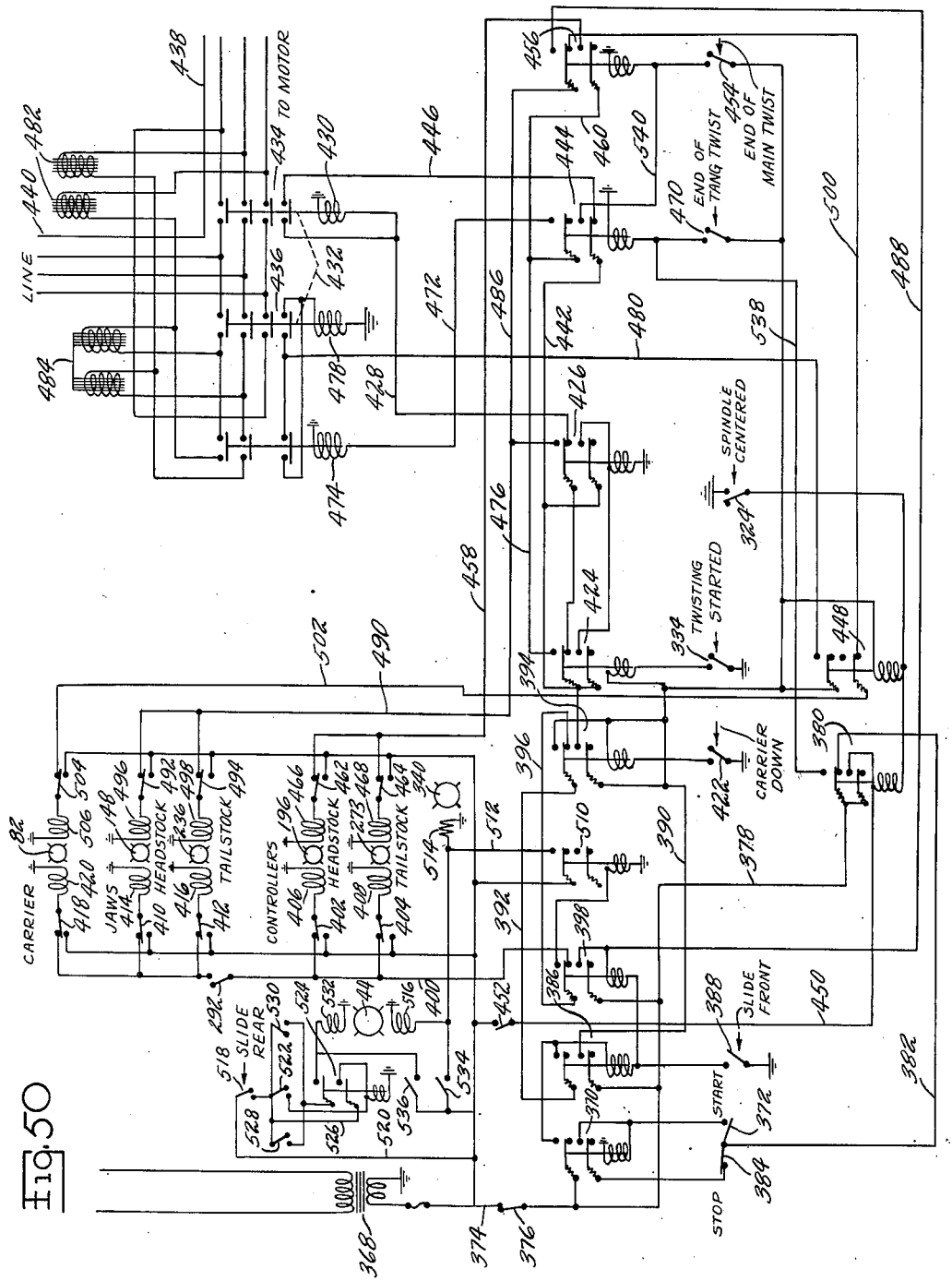

United States Patent Office 2,791,469
Patented May 7, 1957

2,791,469
MACHINE AND METHOD FOR MAKING TWISTED BRUSHES

Robert W. Vose, West Springfield, Mass., assignor to The Fuller Brush Company, Hartford, Conn., a corporation of Connecticut Application December 13, 1952, Serial No. 325,809

64 Claims. (Cl. 300—2)

The invention relates to a machine and a method for making brushes of the type having two longitudinal wires twisted upon each other with a layer of transverse brush fibers between them.

One object of the invention is to provide a machine for the purpose set forth having two relatively rotatable pairs of jaws for engaging the wires near the ends thereof and also having at least one device, designated as a controlling device, which is associated with one pair of jaws and preferably in substantially fixed longitudinal relationship therewith and which engages the wires adjacent the corresponding end of the fiber layer, the said controlling device serving during relative rotation of the pairs of jaws to initially prevent twisting of the portions of the wires between the said device and the corresponding pair of jaws and the said controlling device being disengageable from the wires while the relative rotation of the pairs of jaws continues so as to then permit twisting of the last said portions of the wires.

A further object of the invention is to provide various features of mechanical construction and arrangement which effect the attainment of the last said object of the invention.

Another object of the invention is to provide a machine for the purpose set forth and having two controlling devices as above set forth, wherein the controlling devices are so shaped as to form and set the wires with shapes that have various advantages including the control of the fibers when the said controlling devices are released.

Still another object of the invention is to provide a method of making a brush of the type set forth, which method includes the formation of the fiber layer with its end portions thicker than the other portions, includes the formation of the wires with oppositely extending humps as stated immediately prior to twisting, includes the longitudinal movement of some of the fibers in the thicker portions of the fiber layer into the spaces provided by the said wire humps, and includes the closing of the said spaces and the engagement of the last said fibers by the wires during and after partial twisting and while twisting continues.

A further object of the invention is to provide a machine for the purpose set forth having means for automatically tensioning the wires after engagement thereof by the wire engaging means and prior to twisting.

A still further object of the invention is to provide a machine for the purpose set forth including a reversible electric motor for rotating the spindle, the motor being operable in the forward direction to rotate the spindle in the twisting direction and being operable in the reverse direction to rotate the spindle in the reverse direction, and also including means for stopping the motor and the spindle with the latter in a centered position and ready for the next following twisting rotation.

A still further object of the invention is to provide a machine for the purpose set forth having various advantageous features of electrical control for determining the sequence of the several operations.

Still other objects of the invention will be apparent from the drawings and from the following description.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a front view of a machine embodying the invention.

Fig. 2 is a transverse sectional view taken approximately along the line 2—2 of Fig. 1.

Fig. 3 is a fragmentary transverse sectional view similar to Fig. 2 but showing some of the parts in different positions.

Fig. 6 is an enlarged front view of the headstock mechanism with the main guard therefor omitted.

Fig. 7 is an enlarged plan view of the headstock mechanism.

Fig. 8 is a right end view of the tailstock mechanism with some of the parts at the right omitted.

Fig. 9 is a fragmentary schematic view similar to Fig. 8 and showing some of the parts in different positions.

Fig. 10 is a plan view similar in part to Fig. 7, but separately showing the spindle and various parts associated therewith.

Fig. 11 is a longitudinal vertical sectional view taken along the line 11—11 of Fig. 10.

Fig. 12 is a left end view of the parts shown in Fig. 11.

Fig. 13 is a transverse vertical sectional view taken along the line 13—13 of Fig. 11.

Fig. 14 is a transverse vertical sectional view taken along the line 14—14 of Fig. 11.

Fig. 15 is a transverse vertical sectional view taken along the line 15—15 of Fig. 11.

Fig. 16 is a transverse vertical sectional view taken along the line 16—16 of Fig. 11.

Fig. 17 is a view similar to Fig. 10 but showing some of the parts in different positions, this view being partly in section along the line 17—17 of Fig. 11.

Fig. 18 is a view similar to Fig. 17 but showing some of the parts in different positions.

Fig. 19 is a view similar to Fig. 18 but showing some of the parts in still different positions.

Fig. 20 is an enlarged plan view of the tailstock slide and of various parts associated therewith.

Fig. 21 is a longitudinal vertical sectional view taken along the line 21—21 of Fig. 20.

Fig. 22 is a right end view of the parts shown in Fig. 21.

Fig. 23 is a transverse vertical sectional view taken along the line 23—23 of Fig. 21.

Fig. 24 is a transverse vertical sectional view taken along the line 24—24 of Fig. 21.

Fig. 25 is a transverse sectional view taken along the line 25—25 of Fig. 21.

Fig. 26 is a transverse sectional view taken along the line 26—26 of Fig. 21.

Fig. 27 is a view similar to Fig. 20 but showing some of the parts in different positions, this view being taken in section along the line 27—27 of Fig. 21.

Fig. 28 is a view similar to Fig. 27 but showing some of the parts in different positions.

Fig. 29 is a view similar to Fig. 28 but showing some of the parts in still different positions.

Fig. 30 is a front view of the tailstock with the parts in the same positions as Fig. 1.

Fig. 31 is a view similar to Fig. 30 but showing some of the parts in different positions.

Fig. 32 is a view similar to Fig. 31 but showing some of the parts in still different positions.

Fig. 33 is a schematic view showing the jaws and controllers of the headstock and tailstock and also showing wires and fibers in position for twisting.

Fig. 34 is a view similar to Fig. 33 but showing the controllers engaged with the wires.

Fig. 35 is a view similar to Fig. 34 but showing the jaws also engaged with the wires.

Fig. 36 is a view similar to Fig. 35 but showing the primary twisting completed.

Fig. 37 is a view similar to Fig. 36 but showing the controllers disengaged from the wires and showing the tang twisting completed.

Fig. 38 is a view similar to Fig. 37 but showing the jaws disengaged from the wires and showing the tailstock in retracted position.

Fig. 39 is an enlarged plan view of the headstock jaws and controllers.

Fig. 40 is a view taken along the line 40—40 of Fig. 39, this view showing both wires but omitting the front jaw and controller.

Fig. 41 is a perspective view of the parts shown in Fig. 40.

Fig. 42 is a fragmentary view taken along the line 42—42 of Fig. 40, but with the parts separated.

Fig. 43 is a view similar to Fig. 42, but with the parts in wire engaging positions.

Fig. 44 is a fragmentary view taken along the line 44—44 of Fig. 40, but with the parts separated.

Fig. 45 is a view similar to Fig. 44, but with the parts in wire engaging positions.

Fig. 46 is a fragmentary view taken along the line 46—46 of Fig. 40, but with the parts separated.

Fig. 47 is a view similar to Fig. 46, but with the parts in wire engaging positions.

Fig. 48 is a plan view showing one end portion of a partly twisted brush.

Fig. 49 is a diagram of pneumatic cylinders, pipes and valves.

Fig. 50 is a diagram of electrical devices and connections.

GENERAL ORGANIZATION

Figure 4:
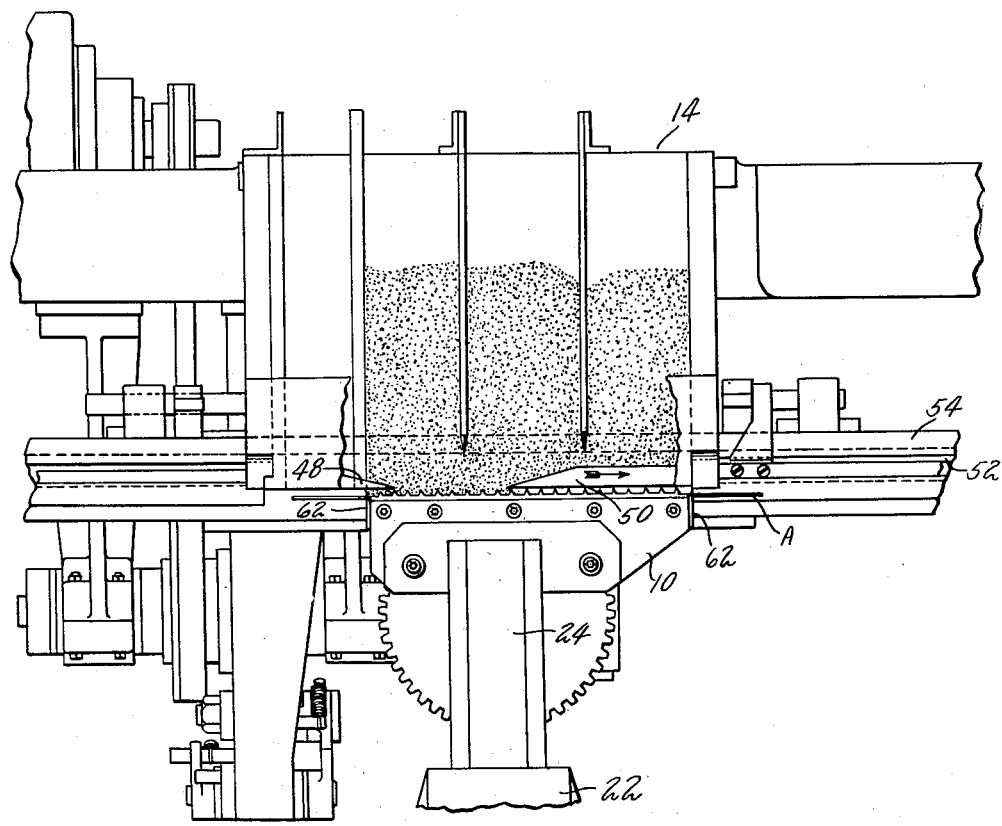
Fig. 4 is a fragmentary front view taken approximately along the line 4—4 of Fig. 2.

A machine embodying the broader structural features of the invention and adapted for practicing the method of the invention can be widely varied, but the machine in any event includes two sets of jaws for engaging two closely spaced and substantially parallel wires near the ends thereof which wires have a layer of transverse fibers between them, and the machine includes means for relatively rotating the jaws of at least one set so that the wires are twisted to firmly engage the transverse fibers and to lock said fibers in place. The machine and method as illustrated are particularly adapted for two entirely distinct and separate parallel wires but the invention in its broader aspects is not so limited.

So far as shown in Figs. 1 to 5 of the drawings, a machine embodying the structural features of the invention and adapted for practicing the method of the invention is generally similar to the machine disclosed in Patent No. 2,572,498 issued October 23, 1951 in the name of Alfred L. LeFebvre. Reference is made to this said patent for various details of construction not herein fully disclosed.

The machine is provided with a carrier 10 which is horizontally movable with respect to a main bed or base 12. This carrier has a generally horizontal longitudinally extending upper portion and is adapted to receive and carry two horizontal wires with a horizontal layer of brush fibers between the wires and extending transversely thereof.

The term "fibers" is used herein in a generic sense and is intended to include any usual or suitable brush filaments or material. The term "two wires" is used herein in a generic sense, and is not necessarily limited to two initially separate or disconnected wires.

The upper portion of the said carrier 10 has a length that is at least equal to the length of the layer of fibers required for the making of a brush, the said length of the fiber layer being such that the ends thereof are spaced from the ends of the wires. Suitably mounted in fixed relation to the base 12 is a magazine for brush fibers generally indicated at 14, and there is also provided a wire feeding means generally indicated at 16, and described in detail in the said patent. The carrier 10 is reciprocable between a forward position as shown in Fig. 1 and a rearward position immediately adjacent the magazine 14, as shown in Fig. 2. In its said forward position the carrier is parallel with the magazine and the wires can be twisted by a twisting mechanism to be hereinafter described. In its said rearward position the carrier can receive a layer of fibers from the magazine 14. The carrier is shown as mounted on a slide 18 horizontally movable along a guideway 20 formed on the base 12, suitable means being provided as hereinafter described for reciprocating the slide and various parts mounted thereon, including the said carrier.

For supporting the carrier 10 there is provided a bracket 22 which is rigidly mounted on the main slide 18. A slide 24 is provided which is vertically movable in suitable guideways in the bracket 22, and the carrier 10 has a cylindrical bottom portion which is directly supported in an opening in the upper end portion of the slide 24. The said slide 24 extends downwardly through an aperture in the main slide 18 and has a lateral extension 26 carrying a roller 28 which enters the cam groove 30 of a stationary cam member 32. During rearward movement of the main slide, the slide 24 and the carrier 10 are moved upwardly by the groove 30 and the roller 28 and during forward movement of the main slide, the slide 24 and the carrier 10 are moved downwardly by the said groove and roller.

For reciprocating the slide 18 there is provided a pneumatic cylinder 34 secured to the bed 12. Within the cylinder is a piston 36 connected by a rod 38 with the slide 18. Pipes 40 and 42 connect the cylinder 34 with a solenoid operated control valve 44 which is shown in Fig. 2 as being at the rear of the machine. This valve is also shown in Figs. 49 and 50. The valve 44 is adapted to receive air under pressure through a pipe 46. With the valve in one position air is delivered through the pipe 40 to move the piston 36 and the slide 18 rearwardly and with the valve in another position air is delivered through the pipe 42 to move the piston 36 and the slide 18 forwardly. The valve 44 is moved alternately to its two said positions by solenoids as hereinafter more fully described.

Figure 5:
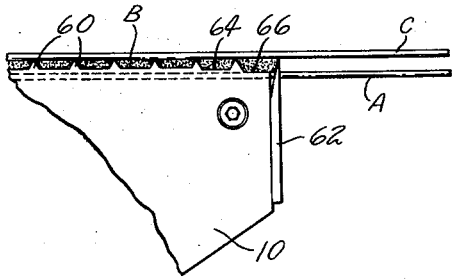
Fig. 5 is an enlarged fragmentary front view similar to a portion of Fig. 4.

During rearward and upward movement of the carrier 10 the wire feeding means 16 serves to deposit a lower wire A thereon. When the carrier is in its upper rearward position as shown in Fig. 2, it receives a layer of transverse fibers B from the magazine 14. The said magazine and the mechanisms thereof are described in detail in the said patent and are briefly described hereinafter. During forward and downward movement of the carrier 10 the wire feeding means 16 serves to deposit an upper wire C thereon. Thus when the carrier reaches its forward position it supports the lower wire A with the layer of fibers B on the said lower wire and with the upper wire C on the fiber layer and above the lower wire, the fiber layer thus being between the two wires and the wires being ready for twisting. The positions of the wires and fiber layer with relation to the carrier are best shown in Fig. 5.

The fiber magazine 14, as shown in Fig. 3, is essentially a rectangular container open at the top and at the bottom, and fibers are placed therein by the operator from time to time so that a sufficient supply is always maintained. Movable across the bottom of the magazine 14 are two similarly formed, but oppositely positioned, slicing bars 48 and 50. These bars are pointed at their ends and they are connected together for reciprocable movement in unison, alternately from left to right and from right to left. Fig. 4 shows the carrier 10 in position immediately below the magazine 14 for receiving a layer of fibers therefrom. The bars 48 and 50 are shown as moving from left to right, and it will be seen that the fibers between the ends of the bars are free to move downwardly onto the carrier. As the bar 50 is withdrawn it permits the fibers to move downwardly, and as the bar 48 advances it slices off a layer of fibers, which layer remains on the carrier 10. The bars support the fibers which are immediately above them, and when the slicing bar 48 has moved entirely across the magazine, it supports all of the fibers, a layer of the said fibers having been sliced off and distributed onto the carrier 10. The length of the layer of the fibers deposited on the carrier 10 is the same as the effective length of the magazine. Upon the next following cycle the slicing bars are movable from right to left, but the operation is otherwise the same.

Suitable mechanism is provided for operating the bars 48 and 50 as soon as the carrier 10 reaches its fiber receiving position, the bars being moved alternately in opposite directions. Fig. 4 shows the bars moving from left to right as has been stated, and when the carrier 10 next reaches its fiber receiving position the bars will be moved from right to left, slicing then being effected in the manner already described by the bar 50 instead of by the bar 48. The two slicing bars 48 and 50 are carried by a slide 52 which is movable horizontally in a stationary guide rail 54.

Suitable mechanisms such as that shown and described in the said patent is provided for moving the slide 54 and the slicing bars first in one direction and in the other direction upon successive movements of the carrier 10 to its rearward and upper fiber receiving position. The said mechanism is driven by a motor 56 and its movement is initiated by a trip member 58 on the bracket 22. Whenever the bracket 22 reaches its rearmost position with the carrier 10 in its upper position, the member 58 starts the said mechanism for moving the slide 52 and the slicing bars either toward the right or toward the left to deposit a layer of fibers on the carrier.

In order to insure that fibers deposited on the carrier from the magazine will lie transversely thereof, the carrier is provided at its top with a plurality of upwardly extending transverse teeth 60, 60, these teeth being evenly spaced throughout the entire length of the carrier. The carrier 10 is provided at its ends with separate vertical plates 62, 62 which retain the fibers at the ends of the layer. The outer faces of the plates 62, 62 are vertical and the said plates have knife edges at the tops thereof for a reason to be hereinafter explained. In order that the carrier 10 may more readily hold and center the wires A and C deposited thereon by the wire feeding means 16, the plates 62, 62 are provided with V-shaped grooves.

Preferably and as shown in Fig. 5, the carrier 10 is so shaped that the layer of fibers received thereby is substantially thicker in relatively short zones at the respective ends. As shown in Fig. 5, the depth of a space 64 near each end is somewhat greater than the depth of the spaces between the teeth 60, 60 in the major portion of the carrier. The depth of a space 66 adjacent each end plate 62 is greater than the depth of the space 64. The said deeper spaces 64 and 66 provide the said zones of greater thickness at the ends of the fiber layer, the reasons for which will be hereinafter apparent.

In order that the layer of fibers B deposited on the carrier may be firmly held in place during forward and downward movement of the carrier, the carrier is preferably hollow and the interior thereof is connected with a vertical hole 68 extending through the slide 24. By means of a flexible hose 70 the hole 68 in the said slide is connected with a suitable suction device so that a partial vacuum is maintained within the interior of the carrier, the partial vacuum serving to hold the layer of fibers.

When the slide 18 and the carrier 10 are in their forward positions, the wires A and C are positioned for twisting as hereinafter described. In order that the carrier 10 may not interfere with the twisting action, it must be additionally moved in the downward direction. The forward end of the cam groove 30 is provided with a downward extension 72 which permits the roller 28 to move downwardly. A plunger 74 is provided which is vertically movable by a pneumatic cylinder 76 on a bracket 78 mounted on the base 12. Connected to the plunger 74 for movement therewith is a member 80 having an extension 81 which is above the upper end of the plunger. A solenoid operated valve 82, shown in Figs. 49 and 50, is connected with the cylinder by pipes 83 and 84. When the valve is in one position, air is admitted to the lower end of the cylinder 76 to move the plunger to its upper position and to hold it in such position. When the valve is in another position, air is admitted to the upper end of the cylinder 76 to move the plunger to its lower position and to hold it in such position. The upper end of the said plunger 74 and the said extension 81, when in their upper positions as shown in Fig. 2, are adapted to receive between them the said extension 26 on the slide 24. When the slide 18 and the parts carried thereby reach their forward positions, the said extension 26 is between the upper end of the plunger and the said extension 81. When the various parts as hereinafter described are ready to effect twisting, the plunger 74 and the extension 82 are moved downwardly by the cylinder 76 to move the extension 26 downward, thus moving the slide 24 and the carrier 10 to their lower positions as shown in Fig. 3. The carrier is thus separated from the wires and the fibers so as to permit twisting. Thereafter and at the proper time the plunger 74 and the extension 82 are moved upwardly by the cylinder 76 to the positions shown in Fig. 2. This restores the carrier to its upper forward position and leaves the extension 26 free to move rearwardly.

For twisting the wires A and C to form a brush there is provided a twisting mechanism which comprises means for engaging the end portions of the wires A and C to effect relative rotation and to thereby effect twisting. Preferably there is a headstock 86 having means for gripping and rotating the wires at one end and a tailstock 88 having means for gripping and holding the wires at the other end to prevent rotation thereof at the last said end, the said headstock and the said tailstock shown as being carried by the slide 18 and as being bodily movable therewith. As shown in Fig. 1, the tailstock is partly covered by removable guards 90 and 92.

Headstock

The headstock 86 and certain mechanism connected therewith are shown in detail in Figs. 6 to 19 of the drawings. Figs. 6 to 8 and Figs. 10 to 16 show the various parts in positions for complete wire engagement. Figs. 17 to 19 show the parts in different successive positions.

The headstock and various associated parts are carried by a plate 94 secured to the slide 18. The headstock proper includes a main bracket 96 secured to the plate 94. Carried by the headstock bracket 96 is a cam 98 for operating the wire feeding means 16, the manner of operation being as shown and described in the said patent. A longitudinal hollow spindle 100 is rotatably mounted in the bracket 96. Carried by the spindle 100 is a grooved belt pulley 102 for rotating the spindle and the parts carried thereby in a manner to be hereinafter described. The spindle 100 and the parts carried thereby are rotatable to various positions but for convenience of illustration they are shown in their "centered" position, that is, in the positions that they occupy for receiving the wires A and C preparatory to twisting.

As best shown in Figs. 6 and 11, the spindle 100 is bifurcated at the projecting left portion thereof. A vertical pivot pin 104 extends through holes in the two bifurcations. Pivotally mounted on the pin 104 are two jaw levers 106 and 108. The lever 108 has similar vertically spaced upper and lower parts and the lever 106 is between the said upper and lower parts of the lever 108. The left end portions of the levers carry serrated inserts 110 and 112 which constitute wire engaging jaws, sometimes hereinafter referred to as the "first" jaws. By movement of the levers 106 and 108 the jaws 110 and 112 can be moved into and out of positions for engaging the wires A and C.

As best shown in Figs. 17 to 19, the right portions of the levers extend through the hollow spindle 100. For operating the levers 106 and 108 there is provided a longitudinally movable rod 114 which is connected with the right ends of the levers by a pin 116 and by pairs of toggle links 118 and 120. When the rod 114 and the links 118, 120 are in the positions shown in Fig. 17, the jaws 110 and 112 are separated by a distance only slightly greater than the diameter of the wires. When the rod 114 and the links 118, 120 are in the positions shown in Figs. 18 and 19, the jaws are moved toward each other and are in positions to engage the wires A and C near the corresponding ends thereof.

For longitudinally moving the rod 114 there is provided a composite member 122 which is nonrotatable and which is connected with the rod to permit the latter to rotate. As shown in Fig. 10, the member 122 is connected with the rod 114 by ball thrust bearings 124 and 126. The member 122 has oppositely disposed trunnion pins 127, 127.

An inclined lever 128 is provided which is movable about a fixed pivot at 130 near its lower forward end. The opposite end of the said lever 128 is connected by links 132, 132 with the trunnion 127, 127 of the member 122. In order that the two links 132, 132 may remain in fixed relationship with each other they are rigidly connected by tie members 134, 134. When the lever 128 is moved pivotally, the member 122 and the rod 114 are moved longitudinally.

Rigidly secured to the plate 94 by means of an upright member 136 is a pneumatic cylinder 138 having a plunger 140 which extends toward the left and is engageable with the lever 128 for moving the said lever toward the left. A stop 142 limits movement of the said lever by the said plunger. A spring 144 biases the lever 128 for movement in the opposite direction. Air under pressure is supplied to the cylinder 138 through a pipe 146. A solenoid operated valve 148, shown in Figs. 49 and 50, is connected with the pipe 146 for controlling the admission of air to the cylinder 138. When air is admitted, the plunger 140 moves the lever 128 toward the left and this in turn moves the rod 114 toward the left. As the rod 114 so moves, it moves the jaw levers 106 and 108 and causes the jaws 110 and 112 to engage the wires A and C in the manner described. When air pressure in the cylinder 138 is released, the spring 144 moves the lever 128 in the opposite direction and the jaws 110 and 112 are separated to release the wires.

As shown in Figs. 10 to 15, two controllers 150 and 152 are pivoted on the before-mentioned pin 104 carried by the spindle 100. The said controllers are hereinafter sometimes designated collectively as a controlling device or as a "first" controlling device. As shown in Fig. 14, the rear portions of the controllers are U-shaped in cross section, the horizontal legs of the controller 150 being below the horizontal legs of the controller 152. The upper horizontal legs are above the jaw levers 106 and 108 and the lower horizontal legs are below the said jaw levers. The left portions of the controllers 150 and 152 carry various elements which, when moved toward each other, engage the wires A and C. The controllers engage the wires A and C at positions closely adjacent the corresponding end of the fiber layer B. During twisting the controllers rotate with the jaws and they serve, while engaged, to prevent twisting of the corresponding end portions of the wires. The controllers have various other purposes, and the details of their construction and their other functions will be hereinafter described.

For pivotally moving the controllers 150 and 152, two longitudinally movable bars 154 and 156 are provided, these bars extending through the hollow spindle 100 and being respectively above and below the jaw levers 106 and 108. A vertical pin 158 extends between the said bars near their left ends and through holes therein. The said jaw levers 106 and 108 are provided with longitudinal slots 160 and 162 through which the pin passes, the said slots permitting longitudinal movement of the pin without interfering with the described movements of the levers. The pin 158 pivotally engages toggle links 164, 166 which are also connected with the controllers 150 and 152. When the bars 154 and 156 and the links 164 and 166 are in the positions shown in Figs. 10 and 18, the controllers 150 and 152 are held in positions for engagement with the wires A and C. When the bars 154 and 156 and the links 164, 166 are in the positions shown in Figs. 17 and 19, the controllers 150 and 152 are separated and the wires are disengaged.

For longitudinally moving the bars 154 and 156 there is provided a member 168 to which the bars are connected, the said member having a central opening through which the rod 114 extends. The member 168 and the rod 114 are movable longitudinally independently of each other. A composite member 170 is provided which is nonrotatable and which is connected with the member 168 to permit the latter to rotate. As shown in Fig. 10, the member 170 is connected with the member 168 by ball thrust bearings 172 and 174. The member 170 has oppositely disposed trunnion pins 176, 176.

An inclined lever 178 is provided which is movable about a fixed pivot at 179 near its lower rear end. The opposite end of the said lever 178 is bifurcated and the bifurcations are connected by links 180, 180 with the trunnion pins 176, 176 of the member 170. In order that the two links may remain in fixed relationship with each other they are rigidly connected by tie members 182, 182. When the lever 178 is moved pivotally, the member 170 and the bars 154, 156 are moved longitudinally.

Rigidly secured to the said upright member 136 is a pneumatic cylinder 186 having a plunger 188 which extends toward the left and is engageable with the lever 178 for moving the said lever toward the left. A stop 190 limits movement of the said lever. A spring 192 biases the lever 178 for movement in the opposite direction. Air under pressure is supplied to the cylinder 186 through a pipe 194. An electrically controlled valve 196, shown in Figs. 49 and 50, is connected with the pipe 194 for controlling admission of air to the cylinder 186. When air is admitted, the plunger 188 moves the lever 178 toward the left and this in turn moves the bars 154 and 156 toward the left. As the bars so move, they move the controllers 150 and 152 into engagement with the wires A and C in the manner described. When air pressure in the cylinder 186 is released, the spring 192 moves the lever 178 in the opposite direction and the controllers 150 and 152 are separated to release the wires.

The wires A and C, with the layer of fibers B between them, are moved into proper relationship with the jaws and controllers when the latter are separated and are in their centered positions as shown in Fig. 17, the wires being moved downwardly with the carrier 10 from the upper position of said carrier as shown in Fig. 2. As before stated, the headstock moves rearwardly and forwardly with the carrier, and during the forward movement in unison the carrier moves the wires downwardly into the described relationship with the jaws and controllers. To permit downward movement of the corresponding ends of the wires the upper portion of the spindle 100 is provided with a central longitudinal slot. Secured to the spindle is a member 198 having a slot 200 which registers with the spindle slot, the said member having ears 202, 202 at the sides of the slot. The adjacent faces of the ears 202, 202 are oppositely inclined for guiding the wires into the slot 200 in the member 198 and into the slot in the spindle. Carried by the lower portion of the spindle and at the inner end thereof, as best shown in Figs. 11 and 13, is a plate 204 which is in position for limiting downward movement of the wires.

*Tailstock*

Referring to Fig. 1, the tailstock 88 includes a main bracket 206 fastened to the slide 18. Longitudinally movable in the bracket 206 is a slide 208. The tailstock slide 208 and certain parts connected therewith are shown in detail in Figs. 20 to 29 of the drawings. Figs. 20 to 26 show the various parts in positions for complete wire engagement. Figs. 27 to 29 show the parts in different successive positions.

As shown in Fig. 21, the slide 208 comprises upper and lower plates 210 and 212 which are rigidly connected with each other. A vertical pivot pin 214 extends through holes in the said plates. Pivotally mounted on the pin 214 are two jaw levers 216 and 218. The lever 216 has similar vertically spaced upper and lower parts and the lever 218 is between the said upper and lower parts of the lever 216. The right end portions of the levers carry serrated inserts 220 and 222 which constitute wire engaging jaws similar to the headstock jaws 110 and 112, sometimes hereinafter referred to as the "second" jaws. Except for adjustability, the lever 218 and its jaw 222 are in fixed positions with respect to the slide. The lever 216 is pivotally movable to move the jaw 220 and to thus cause the two jaws to engage and disengage the wires A and C.

The normally fixed jaw 222 must be adjusted for different wire diameters so that the centers of the wires, when engaged, will be in the plane of the center line of twisting, that is, in line with the axis of rotation of the spindle 100. In order that the jaw 220 may be so adjusted the lever 218 is adjustable on the pin 214. It may be so adjusted and held in adjusted position by screws 224, 226, one serving to move the lever in one direction and the other serving to move it in the opposite direction.

For moving the lever 216 and the jaw 220 there is provided a transverse pneumatic cylinder 228 carried by the slide 208 and having a plunger 230. The said plunger abuts against the left end portion of the lever 216 for moving it toward the rear, so as to move the jaw 220 toward the front and into engagement with the wires. A spring 232 connected with a hook 233 on the lever 216 biases the said lever for movement in the forward direction. Air under pressure is supplied to the cylinder 228 through a pipe 234 shown in Figs. 1 and 49. A solenoid operated valve 236, shown in Figs. 49 and 50, is connected with the pipe 234 for controlling the admission of air to the cylinder. When air is admitted the plunger 230 moves the lever 216 toward the rear to cause the jaws to engage the wires. When air pressure in the cylinder is released the spring 232 moves the lever 216 toward the front and the jaws are separated to release the wires.

As shown in Figs. 20 to 25, two controllers 238 and 240 are pivoted on the pin 214. The said controllers are hereinafter sometimes designated as a controlling device or as a "second" controlling device. As shown in Fig. 24 the rear portions of the controllers are U-shaped in cross section, the horizontal legs of the controller 238 being above the horizontal legs of the controller 240. The upper horizontal legs are above the jaw levers 216 and 218 and the lower horizontal legs are below the said jaw levers. The right portions of the controllers carry various elements which, when moved toward each other, engage the wires A and C. The last said elements of the controllers 238 and 240 are similar to the corresponding elements of the headstock controllers 150 and 152. The tailstock controllers engage the wires A and C at positions closely adjacent the corresponding end of the fiber layer B. During twisting the controllers are nonrotatable and they serve, while engaged, to prevent twisting of the corresponding end portions of the wires. The tailstock controllers have various other purposes which are the same as those of the headstock controllers.

For pivotally moving the controllers 238 and 240, two longitudinally movable bars 242 and 244 are provided, these bars being respectively above and below the jaw levers 216 and 218. Connected respectively with the bars 242 and 244 are plates 246 and 248 having transversely projecting arms which are connected by vertical pins 250. A vertical pin 256 extends between the right portions of the said plates 246 and 248 and through holes therein. The said jaw levers 216 and 218 are provided with longitudinal slots 258 and 260 through which the pin 256 passes, the said slots permitting longitudinal movement of the pin without interfering with the described movements of the levers. Toggle links 262 and 264 connect the pin 256 with the controllers 238 and 240. When the bars 242, 244 and the links 262, 264 are in the positions shown in Figs. 20 and 28, the controllers 238 and 240 are held in positions or engagement with the wires A and C. When the bars 242 and 244 and the links 262, 264 are in the positions shown in Figs. 27 and 29, the controllers 238 and 240 are separated and the wires are disengaged.

For longitudinally moving the bars 242 and 244 there is provided a longitudinal pneumatic cylinder 266 carried by the slide 208 and having a plunger 268. The said plunger abuts against a block 270 connected between the bars 242 and 244 so as to move the bars toward the right. Springs 271, 271 are connected with the pins 250, 250 for moving the bars toward the left. Air under pressure is supplied to the cylinder 266 through a pipe 272, shown in Fig. 49. A solenoid operated valve 273, shown in Figs. 49 and 50, is connected with the pipe 272 for controlling the admission of air to the cylinder. When air is admitted the plunger 268 moves the bars 242 and 244 toward the right so as to move controllers into engagement with the wires. When air pressure in the cylinder is released the springs 271, 271 move the bars toward the left and the controllers are separated to release the wires.

The wires A and C with the layer of fibers B between them are moved into proper relationship between the jaws and controllers when the latter are separated as shown in Fig. 27, the wires being moved downwardly with the carrier 10 from the upper position of said carrier as shown in Fig. 2. As before stated, the tailstock moves rearwardly and forwardly with the carrier, and during the forward movement in unison the carrier moves the wires downwardly into the described relationship with the jaws and controllers. To permit downward movement of the corresponding ends of the wires the upper plate 210 of the slide 208 is provided with a central longitudinal slot 273. Secured to the slide at opposite sides of the slot are ears 274, 274 which are oppositely inclined for guiding the wires into the slot. Secured to the normally fixed jaw 222 is a plate 276, as shown in Figs. 21 and 23, which is in position for limiting downward movement of the wires.

During twisting of the wires the overall length thereof is reduced, and the tailstock slide 208 moves to a corresponding extent toward the right. Means is provided for biasing the slide toward the left so as to maintain tension on the wires during twisting. Preferably and as shown in Figs. 1 and 30 to 32, this means is a chain 278 attached to the slide and extending over suitable idler pulleys, the said chain having a weight (not shown) attached thereto at its lower end.

When twisting has been completed and when the jaws and the controllers have been disengaged from the wires, the chain 278 moves the slide 208 toward the left to its initial position. For limiting the said movement toward the left a chain 280 is provided, the left end of the chain being attached to the slide. The right end of the chain 280 is preferably attached to a lever 282 which is pivoted to the tailstock bracket 206 at 284. A pneumatic cylinder 286 is provided having a plunger 288 which abuts against the lever 282 below the chain 280. A pipe 290 supplies air under pressure to the cylinder 286 so as to move the plunger 288 toward the right and so as to move the lever 282 toward the right to the position shown in Fig. 30. A spring 291 biases the lever for movement toward the left.

Fig. 30 shows the slide 208 in position for the reception of wires between the jaws and the controllers. Air is supplied to the cylinder 286 and the lever 282 is in its right position, the chain 280 preventing any movement of the slide by the chain 278. As shown in Fig. 31, at least the controllers of the headstock and tailstock have been engaged with the wires, but twisting has not started. Simultaneously with or immediately after the engagement of the controllers with the wires and before twisting is started, the air pressure in the cylinder 286 is released and the lever 282 is moved toward the left by the spring 291, a slack being provided in the chain 280. The chain 278 tends to move the slide toward the left, but inasmuch as the controllers have engaged the wires, the said wires are tensioned. The tensioned wires prevent any appreciable movement of the slide 208. This tensioning of the wires prior to twisting is herein referred to as "pretensioning."

Immediately after pretensioning, twisting is started, and as the result of twisting the slide 208 is moved toward the right to the position shown in Fig. 32, the chain 278 resisting such movement and maintaining tension in the wires. Upon the completion of twisting the wires are disengaged, and at or about the same time, air is supplied to the cylinder 286 to restore the lever 282 to the position shown in Fig. 1. The disengagement of the wires enables the chain 278 to move the slide toward the left to the extent permitted by the chain 280, the slide being thus returned to the position shown in Fig. 30.

Mounted on the tailstock is a switch 292 which is normally open but which is closed by the lever 282 when moved from the Fig. 30 position to the Fig. 31 position. The function of the switch 292 will be explained in connection with the electrical diagram, Fig. 50.

*Spindle rotating and controlling mechanism*

The means for rotating and controlling the headstock spindle 100 are shown in Figs. 6 to 9 and more particularly in Figs. 8 and 9, the spindle being rotated in the clockwise direction as viewed in Fig. 8.

Carried by a rearward extension 294 on the main slide 18 is an electric motor 296 having a belt pulley 298 in register with the belt pulley 102 on the spindle. An endless V-belt 300 extends around the two pulleys to enable the motor to drive the spindle. During twisting the motor and the spindle are rotated in the clockwise direction as viewed in Fig. 8.

Connected with the spindle is a disc-like member 302, having a single tooth 304 which faces in the counter-clockwise direction. The member 302 has a spiral surface 306 which extends to the base of the tooth. The bottom of the lower run of the belt 300 travels along and is supported by a resilient member 308, a spring 310 resisting downward movement of the said member. A brake lever 312 is provided above the supporting member 310, the said brake member being movable about a fixed pivot at 314. The brake member 312 has a flat shoe 316 which is adapted to press against the top of the lower run of the belt 300. A spindle stopping latch 318 is pivoted to the brake lever 312 at 320, this lever having an upwardly curved forward end portion which is adapted to be engaged by the tooth 304 on the member 302. A spring 322 is connected with the latch 318 for biasing the said latch in the upward direction and for biasing both the latch and the brake lever 312 for movement toward the front.

During rotation of the spindle in the clockwise direction for twisting, the brake lever 312 and the latch 318 are held by the spring 322 in their forward positions as shown by dotted lines in Fig. 8. The end of the latch engages the member 302 and the tooth 304 moves repeatedly past the latch. Upon the completion of twisting a switch is actuated by the movement of the tailstock slide 208 and this switch serves to reverse the motor 298. Then the spindle is rotated in the reverse direction until the tooth 304 engages the latch 318 as shown in Fig. 9. Thereupon the latch 318 and the brake lever 312 are moved by the tooth toward the rear to the positions shown by full lines in Fig. 8. With the brake lever in the last said position the shoe 316 is forced downwardly to pinch the belt 300 between the said shoe and the member 308. This provides a braking action which stops the movement of the belt and which also stops the rotation of the spindle and the motor. The parts are so constructed and adjusted that the spindle is stopped in its centered position. When the motor is again rotated in the forward direction for the next following twisting operation, the lower run of the belt 300 moves toward the front and the belt therefore cooperates with the spring 322 for moving the parts to the positions shown by dotted lines in Fig. 8.

The movement of the spindle from the position of engage-engagement with the latch as shown in Fig. 9 to the centered position as shown in Fig. 8 corresponds approximately to the amount of reverse spindle rotation required to permit the necessary limited unwinding of the twisted wires that results from their resiliency.

Mounted on the headstock is a switch 324 operable by a lever 326 having a roller which is engageable by the brake lever 312. During twisting and when the lever 312 is in its forward position the switch 324 is closed. When the spindle is centered and when the lever 312 reaches its rear position the switch 324 is opened. The function of the switch 324 will be explained in connection with the electrical diagram, Fig. 50.

Secured to the shaft of the motor 296 is a disc 328 as shown in Fig. 8. A member 330 is eccentrically pivoted adjacent the disc 328, this member being held in frictional engagement with the disc by a spring 332. Positioned below the member 330 is a switch 334. During forward rotation for twisting the disc 328 is rotated in the clockwise direction and the member 330 rides on the disc and is held in a position in the counterclockwise direction from that shown, the said member then engaging the switch 334 to maintain it in closed position. However, when the motor is reversed, the disc 328 rotates in the counterclockwise direction and during about 10° of rotation it turns the member 330 in the clockwise direction to the position shown in Fig. 8, the switch 334 being then opened. The function of the switch 334 will be explained in connection with the electrical diagram, Fig. 50.

*Brush ejecting means*

A forwardly directed jet nozzle 336 is carried by the slide 18 and is located at the rear of the carrier 10 and at about the level of the center line of a completed brush. This nozzle is shown in Figs. 38 and 49 but is for convenience of illustration omitted from other figures. Air may be supplied to the nozzle through a pipe 338, the air being controlled by a solenoid operated valve 340. Upon the completion of each brush air is supplied for a short interval to the nozzle 336, the resulting jet serving to blow the completed brush forwardly and into a suitable receptacle which is not shown.

Sequence of operations

The general sequence of operations will be explained with particular reference to Figs. 33 to 38.

A. The wires A and C and the fiber layer B are assembled as described in connection with Figs. 1 to 5. During such assembly the slide 18 and all parts carried thereby are moved first rearwardly and then forwardly, twisting taking place with the parts in their forward positions. When the parts reach their forward positions the carrier 10 is in its upper forward position as shown in Fig. 1. The end portions of the wires are between the separated first jaws 110, 112 and the separated first controllers 150, 152 of the headstock and between the separated second jaws 220, 222 and the separated second controllers 238, 240 of the tailstock as shown in Fig. 33, the wires and the fibers being still supported on the carrier 10. By reason of their separated positions, the controllers are shown in Fig. 1 as slightly spaced from the carrier 10.

B. The headstock and tailstock controllers are engaged with the wires as shown in Fig. 34, the controllers being then immediately adjacent the ends of the carrier 10 and the ends of the fiber layer B. At or about the same time the wires are pretensioned as described in connection with Figs. 30 to 32.

C. The headstock and tailstock jaws are engaged with the wires as shown in Fig. 35 and at the same time the carrier 10 is lowered so as to be out of the way for twisting and so as to permit longitudinal movement of the tailstock parts.

D. Immediately after the engagement of the wires by the jaws and the lowering of the carrier, rotation of the spindle is started to effect twisting. Inasmuch as the wires are engaged not only by the jaws but also by the controllers, twisting is effected only in the wire portions that are between the two pairs of controllers, that is, in the portions of the wires that are engaged with the fibers. Thus the said portions of the wires can be twisted to the extent necessary to lock the fibers in place and can be twisted to an additional extent so that the turns of the helical structure of the brush lie close together and tend to merge into one another at the periphery of the cylindrical brush fiber formation. During this main twisting there is no longitudinal movement of the first jaws or of the first controllers carried by the headstock, but the second jaws and the second controllers carried by the tailstock slide are drawn toward the right in unison with each other.

E. At the completion of the main twisting the headstock and tailstock controllers are quickly separated to disengage the wires but the headstock and tailstock jaws remain engaged with the wires and spindle rotation is continued. The continued rotation of the spindle jaws effects twisting of the end or tang portions of the wires with resultant reductions in the lengths thereof, as shown in Fig. 37. During the tank twisting and the shortening of the tang lengths there is no longitudinal movement of the first jaws or of the first controllers carried by the headstock, but the second jaws and the second controllers carried by the tailstock slide are drawn additionally toward the right in unison. As the result of the said shortening of the said tang portions and the movement of the second jaws and the second controllers carried by the tailstock slide, the distance between the two pairs of jaws is reduced. Inasmuch as the controllers of each pair are held against longitudinal movement with respect to the corresponding pair of jaws, the distance between the two pairs of controllers is also reduced and becomes less than the length of the cylindrical fiber formation. The controllers of each pair are separated sufficiently to provide clearance for the said cylindrical fiber formation, the end portions of the said formation being between the separated controllers of the two pairs at the completion of tang twisting. Substantially simultaneously with the disengagement of the controllers, the lever 282 on the tailstock is restored to its right position as shown in Fig. 30, thus preparing the chain 280 for subsequently limiting movement of the tailstock slide toward the left.

F. At the completion of the tang twisting the spindle rotation is stopped and the spindle is rotated in the reverse direction at least sufficiently to permit the necessary limited untwisting of the wires resulting from their resiliency. Then the headstock and tailstock jaws are separated to release the wires and the tailstock slide is moved toward the left to the extent permitted by the chain 280, that is, to the position shown in Fig. 38 which is the same as that shown in Fig. 33. Substantially simultaneously with the separation of the jaws to release the wires, the carrier is raised to its initial position. Preferably there is a slight lag in the separation of the tailstock jaws so that the brush is moved toward the left to approximately the position shown in Fig. 38, the brush being then supported on the carrier.

G. At or about the time that the brush is released, air under pressure is supplied to the jet nozzle 336. The air jet from the nozzle blows the brush forwardly into a suitable receptacle. If desired the jet nozzle 336 may be omitted and the completed brushes may be removed manually.

H. The headstock and tailstock parts have now been restored to the positions shown in Fig. 33. The carrier 10 is then raised and the operations set forth in paragraphs A to G above are repeated. The machine continues in operation to make successive brushes. When the jet nozzle 336 is provided it is only necessary for the operator to supply fibers to the magazine 14 and to supply wires to the wire feeding means 16. When the jet nozzle is not provided, the operator must also remove the completed brushes.

Wire bending devices and method

The machine includes devices engageable with the wires at positions adjacent the ends of the fiber layer and serving upon wire engagement prior to twisting to bend the wires for various purposes. As shown, the said devices are included in the headstock controllers 150, 152 and the tailstock controllers 238 and 240 which have been only briefly described.

It has been pointed out that the controllers, when engaged with the wires, as shown in Fig. 36, restrict the main twisting action to the wire portions that are between the controllers, that is, to the wire portions that are engaged with the fiber layer. It has also been pointed out that the controllers when separated from the wires, as shown in Fig. 37, permit the twisting of the tang portions of the wires by continued rotation of the headstock jaws. However, the wire bending devices which are shown as included in the said controllers have other functions and the said devices and their functions will now be described. Reference will be made particularly to Figs. 39 to 47 which show the said devices as included in the headstock controllers, but it will be understood that similar devices are included in the tailstock controllers which last said devices have the same details of construction except for reversals of positions and have the same functions.

Referring particularly to Figs. 39, 40, 41, 44 and 45, it will be observed that the controllers 150 and 152 include two similar but oppositely positioned offset plates 342 and 344 which are so formed that they move past each other as the controllers are moved toward each other. At intermediate positions as shown in Fig. 44 the plates respectively engage the wires A and C and upon continued movement the plates offset the wires in opposite directions, the wire A being moved toward the front and the wire C being moved toward the rear. The effect of the offsetting is to pretwist the portions of the wires between the said plates and the corresponding end of the fiber layer, this pretwisting being in the same direction as the normal twisting that is to follow. The portions of the wires at the right of the offset plates, as viewed in Fig. 41, are pretwisted in the opposite direction but this is unimportant. When the plates reach the positions shown in Fig. 45, the wires have been respectively raised and lowered by the action of other parts to be described.

Referring particularly to Figs. 39, 40, 41, 42 and 43, it will be observed that the controllers 150 and 152 also include so-called plow plates 346 and 348 which are similar but oppositely positioned. The plates 346 and 348 are spaced toward the ends of the wires from the offset plates 342 and 344. The plates 346 and 348 have longitudinal wire receiving grooves 350 and 352 which have transversely inclined upper and lower faces for engaging the wires. As the controllers are moved toward each other the before-described offset plates 342 and 344 first engage the wires and as the said plates move they move the wires into the grooves 350 and 352 of the plates 346 and 348 and momentarily into positions that are respectively toward the rear and toward the front from the positions shown in Fig. 42. However, as the plates 346 and 348 move toward each other from the Fig. 42 position to the Fig. 43 position, the wires are restored to approximate vertical register with each other as shown in Fig. 43 and are also forced downwardly and upwardly and toward each other so that the end portions beyond the said plates are in contact as shown in Figs. 40 and 41. The front portions of the wire engaging faces of the grooves 350 and 352 may be beveled or rounded so as to avoid sharp bends and so that the wire portions at the left of the plates may be inclined upwardly and downwardly as shown in Figs. 40 and 41. Thus the extreme right end portions of the wires that are to be engaged by the jaws are in contact when so engaged. These extreme end portions are not twisted and it is highly desirable that they be in contact in the completed brush to facilitate later operations. As has been stated, the jaws when separated are so spaced as to make it impossible for the end portions of the wires to move past each other when pressed together by the plow plates.

Referring particularly to Figs. 39, 40, 41, 46 and 47, it will be observed that the controllers 150 and 152 also include so-called controlling plates 354 and 356. The plates 354 and 356 are spaced from the offset plates 342 and 344 and away from the ends of the wires. The plates 354 and 356 have generally longitudinal wire receiving grooves 358 and 360 with diverging walls. These grooves while generally longitudinal are oppositely inclined longitudinally, the groove 358 being inclined downwardly and toward the left as shown in Fig. 40 and the groove 360 being similarly inclined upwardly and toward the left. The extreme end portions of the faces of the grooves may be beveled or rounded to avoid any sharp bends in the wires. As the controllers are moved toward each other the offset plates 342 and 344 first engage the wires and move them in opposite directions and partly into the grooves 358 and 360 of the controlling plates. As the controlling plates 354 and 356 move from the Fig. 46 position to the Fig. 47 position the wires are forced into the inner portions of the said grooves 358 and 360 so that they are inclined in conformity with the inclinations of the grooves as shown in Figs. 40 and 41. The said inclined portions of the wires are in vertical register with each other. The upward and downward movements of the portions of the wires C and A that are engaged respectively by the plates 354 and 356 cause downward and upward movements of the fiber engaging portions of said wires, it being observed that this action takes place not only at the headstock as shown, but also at the tailstock. Thus the entire fiber engaging portions of the wires are moved or at least biased toward each other and into firmer engagement with the layer of fibers. As has been pointed out the wires are pretensioned substantially simultaneously with the engagement of the controllers therewith and this avoids any tendency for the wires to move past each other with resultant spilling of the fibers when said wires are biased toward each other. The inclination of the wires by the grooves 358 and 360 serves to move the said wires respectively upwardly and downwardly at the offset plates 342 and 344 as shown in Fig. 45, but this is incidental and unimportant.

Summarizing as to the actions of the several plates of the controllers as the controllers move toward each other, it will be apparent that the offset plates 342, 344 serve to move the wires A and C respectively toward the front and toward the rear, this movement initially causing the wires to enter the grooves in the plates 346, 348 and 354, 356 while the last said plates are still separated. As movement continues, the plates 346, 348 and 354, 356 restore to vertical register the wire portions that they engage, the plates 346, 348 pressing the wire portions at the right into contact with each other and the plates 354, 356 serving indirectly to bias the wire portions at the left into firmer engagement with the fibers B with incidental downward and upward movement of the wire portions at the offset plates. The horizontal bending of the wires by the offset plates 342 and 344 in cooperation with the plow plates 346 and 348 and the controlling plates 354 and 356 forms them with oppositely disposed rearward and forward "humps" with a space between the said humps. The humps are "set," there being no substantial tendency for the wires to return to their straight positions when disengaged by the controllers.

As the result of the downward and upward bending or biasing of the fiber engaging portions of the wires C and A, said wire portions immediately adjacent the controlling plates 354 and 356 converge toward the left as shown in Fig. 40, there being a wider space 362 between them in the zone immediately adjacent said controlling plates. However, as has been stated, the end zones of the fiber layer are somewhat thicker and this enables the fibers to fill the above-mentioned wider spaces 362 between the wires.

As has been stated, the controllers and more particularly the controlling plates 354 and 356 thereof are initially immediately adjacent the corresponding end of the carrier 10 and of the fiber layer B. The controlling plates thus serve to hold the fibers in the ends of the layer perpendicular to the wires and they also serve to prevent any longitudinal movement of the last said fibers during twisting. It has been pointed out that the plates 62, 62 at the ends of the carrier 10 have knife edges at their tops. The controlling plates 354 and 356 of the headstock controllers and the corresponding plates of the tailstock controllers engage the wires A and C before the carrier is lowered and they engage the said wires at positions very close to the said plates 62, 62. On account of the sharp edges of the said plates 62, 62 the ends of the fiber layer, particularly at the top, are very close to the said controller plates, and this reduces to a minimum any movement of the end fibers of the layer longitudinally of the wires when the carrier is lowered.

When the headstock and tailstock controllers are fully engaged with the wires, the headstock and tailstock jaws are moved to grip the wires near the ends thereof. It is important that the controllers be engaged first as the bending of the wires by the controllers shortens the overall length thereof. If the jaws were engaged first they would interfere with the described bending.

As soon as the controllers of both pairs and the jaws of both pairs have been engaged with the wires, the headstock controllers and jaws are rotated to effect twisting. Rotation is continued until the twisting of the portions of the wires between the two pairs of controllers is completed. Thereupon the controllers of both pairs are quickly separated to disengage the wires but rotation is continued to effect the twisting of the tangs between the ends of the fiber layer and the jaws.

By reason of the slightly wider spacing between the wires at the controlling plates 354 and 356, some of the fibers immediately adjacent the said plates are not locked by the main twisting action. As soon as the controllers are disengaged, there is an unavoidable tendency for some of the last said fibers to move longitudinally and, in the absence of some special provision, this would result in a thin and irregular brush end. However, as has been stated, the end zone of the fiber layer is thicker, this making it possible for some of the fibers to move longitudinally as stated, while maintaining the desired thickness of the fiber layer. The fibers that so move start to enter the space between the two opposite wire humps as shown at 364 in Fig. 48, said humps being "set" and having been made by the offset plates 342 and 344 as before explained. However, the wires have been pretwisted at the said humps and there is no interruption of the twisting action. The result is that the space between the humps is almost immediately closed by the continued twisting action so as to limit the longitudinal movement of the fibers at 364 and to grip and lock the said fibers. Thus the brush is formed with a sharply defined end portion, the fiber layer being substantially uniform throughout its length.

The described procedure constitutes a novel method of making a brush of the type defined, the said method including the formation of a layer of fibers positioned between two longitudinal wires with the said layer having its end zones thicker than the other portions thereof and spaced from the ends of the wires, engaging the wires at portions adjacent the ends of the fiber layer to initially prevent longitudinal movement of the fibers in the end portions of the layer and to form the wires with set humps extending away from each other, engaging the wires near the ends thereof to effect relative rotation and to cause twisting of the wires between the first said engaged portions thereof, disengaging the wires at the first said engaged portions while twisting continues so as to enable some of the fibers in the thicker end zones of the fiber layer to move longitudinally into the spaces provided between the said wire humps, and continuing the relative rotation and the twisting of the wires to cause the closing of the said spaces and the engagement of the last said fibers by the wires to limit longitudinal movement of the said fibers and to grip and lock the said fibers.

*Pneumatic diagram*

In the preceding description references have been made to various pneumatic cylinders together with pipes and valves therefor. The relationship of the various pneumatic elements will be more clearly understood by reference to Fig. 49.

A main air supply pipe 365 is provided which is connected with a suitable source of air under pressure. The slide traverse cylinder 34 is connected with the pipe 365 by means of the pipes 40 and 42 and the valve 44. The carrier cylinder 76 is connected with the pipe 365 by means of the pipes 83 and 84 and the valve 82. The headstock and tailstock controller cylinders 186 and 266 are connected with the pipe 365 by means of the pipes 194 and 272 and the valves 196 and 273. The headstock and tailstock jaw cylinders 138 and 228 are connected with the pipe 365 by means of the pipes 146 and 234 and the valves 148 and 236.

As has been stated, it is desirable to provide a slight lag in the separation of the tailstock jaws so that the completed brush will be moved to an intermediate position as shown in Fig. 38. This lag may be effected by providing a restriction 366 in the pipe 234 for the tailstock jaw cylinder 228. This restriction 366 slightly delays the disengagement of the tailstock jaws from the wires.

The pretension cylinder 286 is connected with the pipe 365 by means of the pipe 290 and the valve 273 which also controls the tailstock controller cylinder. The valve 273 is so constructed and connected that air pressure is released in the pretension cylinder 286 when air is supplied to the controller cylinder 266. Thus the cylinder 286 releases the lever 282 to effect pretensioning substantially simultaneously with the engagement of the tailstock controllers with the wires. When the valve 273 is moved to permit the release of the tailstock controllers, air is supplied to the cylinder 286 so that the lever 282 is restored to the position shown in Fig. 30. Pretension must not be effected prior to complete engagement of the controllers and if necessary provision may be made for a slight lag in the action of the pretension cylinder 286. This provision may take the form of a restriction 367 in the pipe 290.

The ejection nozzle 336 is connected with the pipe 365 by means of the pipe 338 and the valve 340.

*Electrical diagram*

In considering the electrical diagram in Fig. 50, it will be assumed that the slide 18 is in its forward position with the carrier 10 and the slide 24 in their upper forward positions and that wires A and C with brush fibers B are in place on the carriers as shown in Fig. 5 and are ready for twisting. The spindle is assumed to be in its centered position and all relays are assumed to be in their released positions. Current is supplied to the system through a transformer 368.

A. A starting relay 370 is provided which can be actuated by means of manually operable starting switch 372. When the switch 372 is closed a circuit is established from a main lead 374, through a normally closed reset switch 376, through a conductor 378, through the normally engaged contacts of a relay 380, through a conductor 382, through the switch 372, and through the coil of the relay 370. When the relay 370 is actuated, the lower contacts thereof establish a holding circuit through the coil of the relay and through a manually operable and normally closed stop switch 384. The coil of the relay 370 remains energized until the circuit thereof is broken at the stop switch 384 or at the reset switch 376 or at the relay 380.

B. When the relay 370 is actuated, a connection is established to the upper stationary contact of a relay 386 and through the coil thereof, the said coil being connected in series with a switch 388. The said switch 388 is mechanically connected with the slide 18 of the machine so as to be closed whenever the said slide is in its forward position and to be open when the slide is not in its forward position. With the switch 388 closed the relay 386 is actuated so that the remainder of the network is fed through the lower contacts of the relay and through a conductor 390.

C. When the upper contacts of the relay 386 are engaged, a circuit is established through a conductor 392, through the initially engaged contacts of a carrier relay 394, through a conductor 396 and through the initially engaged upper contacts of a sequence relay 398 to a conductor 400. The said conductor 400 is connected in parallel through normally closed switches 402 and 404 to the coils 406 and 408 of the before-mentioned solenoid operated valves 196 and 273 which serve respectively to admit air to the controller cylinders 186 and 266. Upon the admission of air, the said cylinders serve respectively to cause the controllers of the headstock and tailstock to engage the wires. The said conductor 400 is connected in series with the before-mentioned switch 292 and then in parallel through normally closed switches 410 and 412 to the coils 414 and 416 of the before-mentioned solenoid operated valves 148 and 236 which serve respectively to admit air to the jaw cylinders 138 and 228. Upon the admission of air, the said cylinders serve respectively to cause the jaws of the headstock and the tailstock to engage the wires. Also connected in parallel with the last said switches and coils is a normally closed switch 418 and the coil 420 of the before-mentioned solenoid operated valve 82 which serves to admit air to the cylinder 76 for moving the carrier 10. When the coil 420 is energized air is admitted to the top of the said cylinder 76 and the carrier 10 is moved downwardly so as to provide space for twisting. As has been explained in the description of the pneumatic diagram, Fig. 49, and in the description of the tailstock, the pretension cylinder 286 is operated substantially simultaneously with the engagement of the controllers with the wires, the said cylinder releasing the lever 282 and permitting the spring 291 to move the said lever toward the left. When the lever 282 moves toward the left it closes the switch 292. Thus the switch 292 is not closed until the controllers are engaged with the wires, and this causes a lag in the engagement of the jaws with the wires and in the lowering of the carrier 10.

D. A switch 422 is mechanically connected with the carrier 10 or with the slide 24 therefor, this switch being open when the carrier is in its upper forward position and being closed when the carrier moves downwardly from its said upper position. The closing of the switch 422 actuates the relay 394, a circuit being established through the said conductor 390 and the lower contacts of the previously actuated relay 386. When the relay 394 is actuated, the movement of its upper movable contact breaks the described circuit for the coils 406, 408, 414, 416 and 420, but the positions of the corresponding valves are not changed. At the same time the upper contacts of the relay 394 establish a holding circuit through the said conductor 392 and upper contacts of the said previously actuated relay 386 to maintain the coil thereof energized. The last said circuit prevents release of the said relay 386 and prevents opening of the circuit through the conductor 390 to the twisting motor, even though the stop switch 384 be opened to release the starting relay 370.

E. The actuation of the relay 394 also establishes a circuit through the initially engaged contacts of relays 424 and 426, through a conductor 428 and through the forward coil 430 of a main reversing switch 432 for the twisting motor 296. The switch 432 includes contacts 434 which are engaged for forward rotation of the motor and the contacts 436 which are engaged for reverse rotation of the motor. The energization of the coil 430 operates the switch to engage the contacts 434 and to cause rotation of the motor in the forward or twisting direction. The motor is operated through the conductors 438 which are connected with the main leads 440. Included in the switch contacts 434 are lower contacts which when engaged maintain a holding circuit through the coil 430, this last said circuit extending through the said relay 394, through a conductor 442, through the initially engaged lower contacts of a relay 444 and through a conductor 446.

F. The before-described switch 334 is connected in series with the coil of the said relay 424. At the end of about the first 30° rotation of the motor 296 in the twisting direction, the switch 334 is closed, thus actuating the relay 424. The engagement of the lower contacts of the relay 424 actuates the relay 426 as a slave. The lower contacts of the relay 426 maintain a holding circuit through the coil thereof which circuit is independent of the relay 424. The actuation of the relays 424 and 426 breaks the previously described initial circuit through the motor switch coil 430, but the energization of the said coil is maintained by the described holding circuit through the initially engaged contacts of the said relay 444. The last said circuit is maintained until twisting is completed.

G. The before-mentioned switch 324 is mechanically connected as described so as to be open when the spindle is in its centered position. However, when the spindle is first rotated out of its centered position, the said switch 324 is closed, thus actuating a relay 448 and also establishing a connection to the before-mentioned relay 380. The actuation of the relay 448 is preparatory to later operations. The circuit for the coil of the relay 380 extends through a conductor 450 and through a normally open manually operable stop switch 452. In view of the fact that the switch 452 is open, the relay 380 is not actuated by the closing of the switch 324.

H. During twisting the tailstock slide 208 is drawn toward the right as previously explained. A switch 454 is mechanically connected so as to be closed when the tailstock slide has moved to the extent required for the primary or main twisting. The closing of the switch 454 actuates a relay 456 to establish a circuit to a conductor 458, the said circuit extending through the lower contacts of the relay 394, through the upper contacts of the relay 424 and through a conductor 460. The said contacts of the relays 344 and 424 remain in engagement by reason of the continued closed positions of the switches 422 and 334. The said conductor 458 is connected in parallel through normally closed switches 462 and 464 to other coils 466 and 468 of the said solenoid operated valves 196 and 273 for the controller cylinders 186 and 266. When operated by the coils 466 and 486, the said valves release the air pressure within the cylinders and enable the springs 192 and 271 to disengage the headstock and tailstock controllers from the wires. The spindle continues to rotate notwithstanding the disengagement of the controllers, the jaws remaining in engagement with the wires and effecting the twisting of the tangs.

I. During the twisting of the tangs the tailstock slide 208 continues to be drawn toward the right. A switch 470 is mechanically connected so as to be closed when the tailstock slide has moved to the additional extent required for tang twisting. The closing of the switch 470 actuates the relay 444 and breaks the described holding circuit through the forward coil 430 of the motor reversing switch 432. At the same time the relay 444 establishes a circuit through a conductor 472 and a fast reverse relay 474, the said circuit including the upper contacts of the relay 424 and a conductor 476. The lower contacts of the relay 474 establish a circuit which energizes the reverse coil 478 of the main switch 432 so as to engage the reverse contacts 436 of the said switch. The last said circuit includes the upper contacts of the previously actuated relay 448 and a conductor 480. When the reverse coil 478 is energized, the lower contacts at 436 establish a holding circuit for the said coil 478, this holding circuit including the said relay 448 and the said conductor 480. The relay 474 also connects two of the motor conductors 438 with the main leads 440 through reactors 482, the motor being then operated in the reverse direction. Other reactors 484 are provided but these are shorted out during the initial reverse rotation of the motor.

J. After about 10° of reverse motor rotation the switch 334 is opened as previously described. The said amount of reverse rotation of the motor corresponds approximately to the amount of reverse rotation of the spindle necessary to permit the necessary limited unwinding of the twisted wires that results from their resiliency. When the switch 334 is opened, the relay 424 is released but the slave relay 426 is not released, being held by its holding circuit through the relay 394 which is still in its actuated position. The release of the relay 424 releases the relay 474, and this serves to cut the reactors 484 into the motor circuit in series with the reactors 482. Inasmuch as the initial reverse rotation of the motor is limited to about 10°, only a relatively slow speed of rotation is attained. The additional reactors 484 are so selected or adjusted that the resultant voltage is merely sufficient to maintain the speed attained during the said first 10° of reverse rotation without, however, increasing the said speed. The release of the relay 424 also opens the circuit through the conductor 458 to the solenoids 466 and 468, but this does not cause actuation of the corresponding valves.

K. The release of the relay 424 also establishes a circuit through the relay 426, through a conductor 486, through the relay 456, and through a conductor 488 to actuate the before mentioned relay 398. The lower contacts of the said relay 398 establish a holding circuit for its coil, this circuit including the switch 388. The relay 398 therefore remains actuated notwithstanding the immediately subsequent opening of the switch 454 and the release of the relay 456.

L. The release of the relay 424 also establishes a circuit through the relay 426 to a conductor 490. The said conductor 490 is connected in parallel through normally closed switches 492 and 494 to other coils 496 and 498 of the solenoid operated valves 148 and 236 for the jaw cylinders 138 and 228. When operated by the coils 496 and 498, the said valves release the air pressure within the cylinders and enable the springs 144 and 232 to disengage the jaws from the wires. As soon as the jaws disengage the wires the tailstock slide 208 is moved toward the left by the chain 278 as previously described. As the tailstock slide moves toward the left the switches 470 and 454 are opened and the relays 444 and 456 are released. The release of the relay 456 opens the circuit through the conductor 458 to the solenoids 466 and 468 but this does not cause actuation of the corresponding valves.

M. The motor 296 continues to rotate in the reverse direction until the spindle is caught and held by the previously described latch 318. The said latch causes the opening of the switch 324 and thus releases the relay 448. The said relay 448 breaks the holding circuit through the conductor 480 to the motor switch reverse coil 476, the said switch 432 being then in neutral position and the motor being idle. The reverse rotation of the motor is braked in the manner previously described.

N. As before stated, the movement of the tailstock slide 208 toward the left by the chain 278 has caused the opening of the switches 470 and 454 and has released the relays 444 and 456. At this stage the relays 394 and 426 are actuated and the relays 424, 444 and 456 are released. A circuit is thus established through the relays 394, 424, 426 and 456 to a conductor 500. The relay 448 has been released by the opening of the switch 324 and the said relay 448 makes connection between the said conductor 500 and a conductor 502. The conductor 502 is connected through a normally closed switch 504 with the other coil 506 for the valve 82. The valve 82 then serves to admit air to the bottom of the cylinder 76 for moving the carrier 10 and the slide 24 upwardly to their upper front positions.

O. As soon as the carrier 10 and its slide 24 reach their upper positions the switch 422 is opened, thus releasing the relay 394 which in turn releases the relay 426. The release of the relay 426 breaks the circuit through the conductor 502 to the coil 506 but this does not cause actuation of the corresponding valve. If the starting relay 370 has in the meantime been released, the release of the relay 394 breaks the holding circuit for the relay 386, thus releasing the last said relay and terminating the cycle.

P. If the starting relay 370 has not been released, the relay 386 remains actuated. The release of the relay 394 by the opening of the carrier switch 422 establishes a circuit through the said relay 394, through the conductor 396 and through the relay 398 which is still actuated to actuate a relay 510.

Q. The actuation of the relay 510 establishes a circuit to a conductor 512 which is connected with the coil 514 of the before-mentioned solenoid valve 340, the valve being opened to supply air through the pipe 338 to the jet nozzle 336 for blowing the completed brush forwardly into a suitable receptacle.

R. The conductor 512 is also connected with the forward coil 516 of the before-mentioned solenoid operated valve 44, the said coil operating the valve to admit air through the pipe 40 to the front end of the traverse cylinder 34. The slide 18 and all parts carried thereby are then moved rearwardly to the positions shown in Fig. 2. As the slide 18 is moved rearwardly the switch 388 is opened, thus releasing the relays 386, 398 and 510 so as to leave the entire network in its initial starting position.

S. When the slide 18 reaches its rear position, it closes a switch 518 connected with the main lead 374 by a conductor 520. Connected in series with the switch 518 is a switch 522 which is mechanically connected to be momentarily closed whenever the slide 52 for the slicing bars 48 and 50 passes its mid-position in either direction. The closing of the switch 522 actuates a relay 524, and a holding circuit for the coil thereof is established through a conductor 526 in series with the switch 518. Also connected in series with the switch 518 are two switches 528 and 530, the last said switches being in parallel with each other and with the switch 522. The switch 528 is mechanically connected to be closed when the slicing bar slide 52 reaches its extreme left position and the switch 530 is mechanically connected to be closed when the slicing bar slide reaches its extreme right position. As has been previously explained, the slide 52 and the slicing bars are mechanically moved either from right to left or from left to right whenever the slide 18 reaches its rear position. Assuming movement of the slicing bar slide from right to left, the switch 528 is closed at the end of such movement and a circuit is established through the switch 518, the switch 528 and the relay 524 to the forward coil 532 of the valve 44. The said coil 532 operates the valve to admit air to the rear end of the traverse cylinder 34, so as to move the slide 18 and all parts carried thereby to their forward positions. When the slicing bar slide moves from left to right the operation is the same except that the circuit is established through the switch 530 and not the switch 528. When the slide 18 starts its forward movement, the switch 518 is opened, thus breaking the holding circuit for the relay 524 and permitting the release of the said relay.

T. When the slide 18 reaches its forward position, the switch 388 is again closed, thus energizing the relay 386 and starting a repetition of the complete cycle as described.

U. The before-mentioned switches 402, 404, 410, 412, 418, 462, 464, 492, 494 and 504 are manually operable. It will be obvious without detailed explanation that these switches enable the machine operator to manually effect engagement or release of the controllers and jaws and to manually effect upward or downward movement of the carrier 10 and the slide 24. Such manually effected movements are useful for setup and test purposes. Preferably, manually operable switches 534 and 536 are provided which enable the operator to manually effect movement of the slide 18 in the rearward direction or in the forward direction.

V. For repetitive operation the switch 384 remains closed. If the switch 384 is opened, even momentarily, the relay 370 is released, and the cycle of operations is interrupted at one stage or another as follows:

a. If the carrier 10 and the slide 24 have not been lowered to close the switch 422, the cycle will be immediately interrupted. The relay 386 is either not actuated or there is no holding circuit therefor to keep it actuated after the release of the relay 370.

b. Unless interrupted as in a, the cycle is interrupted at the end of the forward traverse movement of the slide 18. Normally the switch 388 closes the circuit to actuate the relay 386, but this cannot take place with the relay 370 released.

c. Unless interrupted as in a or b, the cycle is interrupted at the completion of the twisting cycle, when the holding circuit for the relay 386 is broken by the release of relay 394. Closing of the starting switch 372 actuates the starting relay 370, and the cycle is resumed after interruption as in a, b or c above.

W. The relay 380 is not normally actuated but can be actuated by momentarily closing the motor stop switch 452. The switch 452 is closed in the event of an emergency, such as the missing of a brush or the twisting off or breaking of a brush. Under the last said conditions the motor would run indefinitely as there would be no movement or insufficient movement of the tailstock slide to close the switches 454 and 470. The relay 380 when actuated establishes a holding circuit for its own coil, this circuit extending through the switch 324 which is closed except at the end of the cycle. The actuation of the relay 380 also breaks the holding circuit for the relay 370. At the same time a circuit is established through a conductor 538 to the relay 444. The said relay 444 is actuated and this actuates the relay 456 through a conductor 540. The cycle is then "artificially" completed as set forth in paragraphs H through O above. The opening of the switch 324 releases the relay 380, and the machine stops with the slide 18 in its forward position, as set forth in paragraph V-a above. The parts are thus properly positioned for inspection and for clearing of the incomplete or broken brush. Upon closing the starting switch 372 the cycle is resumed beginning with a rearward traverse movement of the slide 18.

X. The reset switch 376 may be momentarily opened at any time. This releases all relays and stops the motor, but it does not return the spindle to its centered position and it does not prepare the network for a proper resumption of the cycle. After operation of the reset switch, the starting switch 372 must be closed and then the motor stop switch 462 must be closed to artificially complete a cycle as described in paragraph W. The reset switch should be opened to release all relays before manually operating any of the switches 402, 404, 410, 412, 418, 462, 464, 492, 494 and 504.

The invention claimed is:

1. In a machine for making a brush by twisting two longitudinal wires having between them a layer of transverse brush fibers with the ends of the fiber layer spaced from the ends of the wires, the combination of two longitudinally spaced first and second pairs of jaws, means for causing the jaws of the two pairs to respectively engage the two wires near the ends thereof, a controlling device adjacent the said first pair of jaws and fixed against longitudinal movement relatively thereto, the said controlling device being engageable with the two wires at a position spaced from the said first pair of jaws and near the corresponding end of the fiber layer to prevent twisting of the wires between the controlling device and the said first pair of jaws, means for effecting relative rotation about a longitudinal axis between the said first pair of jaws together with the said controlling device and the said second pair of jaws so as to twist the portions of the wires that are engaged with the fiber layer with resultant locking of the fibers in place, and means for transversely moving the controlling device relatively to the said first pair of jaws and out of engagement with the two wires while the jaws of both pairs remain engaged with the said wires so as to enable the said pairs of jaws upon additional relative rotation about the said longitudinal axis to additionally twist the wires between the said first pair of jaws and the corresponding end of the fiber layer.

2. In a machine for making a brush by twisting two longitudinal wires having between them a layer of transverse brush fibers with the ends of the fiber layer spaced from the ends of the wires, the combination of two longitudinally spaced first and second pairs of jaws, means for causing the jaws of the two pairs to respectively engage the two wires near the ends thereof, a controlling device adjacent the said first pair of jaws and fixed against longitudinal movement relatively thereto, the said controlling device being engageable with the two wires at a position spaced from the said first pair of jaws and near the corresponding end of the fiber layer to prevent twisting of the wires between the controlling device and the said first pair of jaws, means for effecting relative rotation about a longitudinal axis between the said first pair of jaws together with the said controlling device and the said second pair of jaws so as to twist the portions of the wires that are engaged with the fiber layer with resultant locking of the fibers in place, and means operable during relative rotation of the pairs of jaws and while the jaws of the said pairs remain engaged with the said wires for transversely moving the controlling device relatively to the said first pair of jaws and out of engagement with the two wires so as to enable the said pairs of jaws during continued relative rotation about the said longitudinal axes to additionally twist the wires between the said first pair of jaws and the corresponding end of the fiber layer.

3. In a machine for making a brush by twisting two longitudinal wires having between them a layer of transverse brush fibers with the ends of the fiber layer spaced from the ends of the wires, the combination of two longitudinally spaced pairs of jaws, means for causing the jaws of the two pairs to respectively engage the two wires near the ends thereof, two controlling devices respectively adjacent the said pairs of jaws and fixed against longitudinal movement relatively thereto, the said controlling devices being respectively engageable with the two wires at positions spaced from the corresponding pairs of jaws and near the corresponding ends of the fiber layer to prevent twisting of the wires between the said controlling devices and the corresponding pairs of jaws, means for effecting relative rotation about a longitudinal axis between one pair of jaws together with its controlling device and the other pair of jaws together with its controlling device so as to twist the wires between the said controlling devices with resultant locking of the fibers in place, and means for transversely moving the two controlling devices relatively to the corresponding pairs of jaws and out of engagement with the two wires while the jaws of both pairs remain engaged with the said wires so as to enable the said pairs of jaws upon additional relative rotation about the said longitudinal axis to additionally twist the wires between the said pairs of jaws and the ends of the fiber layer.

4. In a machine for making a brush by twisting two longitudinal wires having between them a layer of transverse brush fibers with the ends of the fiber layer spaced from the ends of the wires, the combination of two longitudinally spaced pairs of jaws, means for causing the jaws of the two pairs to respectively engage the two wires near the ends thereof, two controlling devices respectively adjacent the said pairs of jaws and fixed against longitudinal movement relatively thereto, the said controlling devices being respectively engageable with the two wires at positions spaced from the corresponding pairs of jaws and near the corresponding ends of the fiber layer to prevent twisting of the wires between the said controlling devices and the corresponding pairs of jaws, means for effecting relative rotation about a longitudinal axis between one pair of jaws together with its controlling device and the other pair of jaws together with its controlling device so as to twist the wires between the said controlling devices with resultant locking of the fibers in place, and means operable during relative rotation of the pairs of jaws and while the jaws of the said pairs remain engaged with the wires for transversely moving the two controlling devices relatively to the corresponding pairs of jaws and out of engagement with the two wires so as to enable the said pairs of jaws during continued relative rotation about the said longitudinal axis to additionally twist the wires between the said pairs of jaws and the ends of the fiber layer.

5. In a machine for making a brush by twisting two longitudinal wires having between them a layer of transverse brush fibers with the ends of the fiber layer spaced from the ends of the wires, the combination of a rotatable headstock spindle fixed against longitudinal movement, a longitudinally movable tailstock slide, first and second pairs of jaws carried respectively by the headstock spindle and by the tailstock slide and fixed against longitudinal movement relatively thereto, means for causing the jaws of the said pairs to engage the said wires near the respective ends thereof, first and second controlling devices carried respectively by the headstock spindle and by the tailstock slide and fixed against longitudinal movement relatively thereto, the said controlling devices being respectively engageable with the two wires at positions spaced from the corresponding pairs of jaws and near the corresponding ends of the fiber layer to prevent twisting of the end portions of the wires between the said controlling devices and the corresponding pairs of jaws, means for rotating the headstock spindle together with the first pair of jaws and the first controlling device so as to twist the wires between the said controlling devices with resultant locking of the fibers in place, and means operable during rotation of the spindle and while the jaws of the said pairs remain engaged with the wires for transversely moving the two controlling devices relatively to the corresponding pairs of jaws and out of engagement with the two wires so as to enable the said pairs of jaws during continued rotation of the spindle to additionally twist the wires between the said pairs of jaws and the ends of the fiber layer.

6. In a machine for making a brush by twisting two longitudinal wires having between them a layer of transverse brush fibers with the ends of the fiber layer spaced from the ends of the wires, the combination of two longitudinally spaced first and second pairs of jaws, means for causing the jaws of the two pairs to respectively engage the two wires near the ends thereof, a pair of oppositely disposed controllers engageable with the two wires at a position spaced from the said pair of jaws and near the corresponding end of the fiber layer to prevent twisting of the wires between the controllers and the first said pair of jaws, the said pair of controllers being fixed against longitudinal movement relatively to the said pair of jaws, means for effecting relative rotation about a longitudinal axis between the said first pair of jaws together with the said pair of controllers and the said second pair of jaws so as to twist the portions of the wires that are engaged with the fiber layer with resultant locking of the fibers in place in a cylindrical formation, and means operable while the jaws of both pairs remain engaged with the said wires for transversely separating the controllers of the said pair so as to disengage them from the two wires and so as to provide clearance for the corresponding end portion of the cylindrical fiber formation, the disengagement of the controllers from the wires serving to enable the said pairs of jaws upon additional relative rotation about the said longitudinal axis to additionally twist the wires between the said first pair of jaws and the corresponding end of the fiber layer.

7. In a machine for making a brush by twisting two longitudinal wires having between them a layer of transverse brush fibers with the ends of the fiber layer spaced from the ends of the wires, the combination of two longitudinally spaced first and second pairs of jaws, means for causing the jaws of the two pairs to respectively engage the two wires near the ends thereof, first and second pairs of oppositely disposed controllers respectively engageable with the two wires at positions spaced respectively from the said pairs of jaws and near the corresponding ends of the fiber layer to prevent twisting of the wires between the said pairs of controllers and the said pairs of jaws, each of the said pairs of controllers being fixed against longitudinal movement relatively to the corresponding pair of jaws, means for effecting relative rotation about a longitudinal axis between one pair of jaws together with the corresponding pair of controllers and the other pair of jaws together with the corresponding pair of controllers so as to twist the portions of the wires that are engaged with the fiber layer with resultant locking of the fibers in place in a cylindrical formation, and means operable while the jaws of both pairs remain engaged with the said wires for transversely separating the controllers of both pairs so as to disengage them from the two wires and so as to provide clearance between the controllers for the end portions of the cylindrical fiber formation, the disengagement of the controllers from the wires serving to enable the said pairs of jaws upon additional relative rotation about the said longitudinal axis to additionally twist the wires between the said pairs of jaws and the corresponding ends of the fiber layer.

8. In a machine for making a brush by twisting two longitudinal wires having between them a layer of transverse brush fibers with the ends of the fiber layer spaced from the ends of the wires, the combination of a rotatable headstock spindle fixed against longitudinal movement, a longitudinally movable tailstock slide, first and second pairs of jaws carried respectively by the headstock spindle and by the tailstock slide and fixed against longitudinal movement relatively thereto, means for causing the jaws of the said pairs to engage the said wires near the respective ends thereof, first and second pairs of oppositely disposed controllers carried respectively by the headstock spindle and by the tailstock slide and fixed against longitudinal movement relatively thereto, the said controllers of the said pairs being respectively engageable with the two wires at positions spaced from the corresponding pairs of jaws and near the corresponding ends of the fiber layer to prevent twisting of the wires between the said pairs of controllers and the corresponding pairs of jaws, means for rotating the headstock spindle together with the first pair of jaws and the first pair of controllers so as to twist the wires between the said pairs of controllers with resultant locking of the fibers in place in a cylindrical formation, and means operable while the jaws of both pairs remain engaged with the said wires for transversely separating the controllers of both pairs so as to disengage them from the two wires and so as to provide clearance between the controllers for the end portions of the cylindrical fiber formation, the disengagement of the controllers from the wires serving to enable the said pairs of jaws upon additional relative rotation of the headstock spindle to additionally twist the wires between the said pairs of jaws and the corresponding ends of the fiber layer.

9. In a machine for making a brush by twisting two longitudinal wires having between them a layer of transverse brush fibers with the ends of the fiber layer spaced from the ends of the wires, the combination of a rotatable headstock spindle fixed against longitudinal movement, a longitudinally movable tailstock slide, first and second pairs of jaws carried respectively by the headstock spindle and by the tailstock slide and fixed against longitudinal movement relatively thereto, means for causing the jaws of the said pairs to engage the said wires near the respective ends thereof, a first pair of oppositely disposed controllers connected with the headstock spindle for pivotal movements in opposite directions about an axis in fixed relation to the spindle, a second pair of oppositely disposed controllers connected with the tailstock slide for pivotal movements in opposite directions about an axis in fixed relation to the slide, the said controllers of the said pairs being respectively engageable with the two wires at positions spaced from the corresponding pairs of jaws and near the corresponding ends of the fiber layer to prevent twisting of the wires between the said pairs of controllers and the corresponding pairs of jaws, means for rotating the headstock spindle together with the first pair of jaws and the first pair of controllers so as to twist the wires between the said controllers with resultant locking of the fibers in place in a cylindrical formation, and means operable while the jaws of both pairs remain engaged with the said wires for pivotally moving the controllers of each pair about their respective pivotal axes so as to disengage them from the two wires and so as to provide clearance between the controllers for the end portions of the cylindrical fiber formation, the disengagement of the controllers from the wires serving to enable the said pairs of jaws upon additional relative rotation of the headstock spindle to additionally twist the wires between the said pairs of jaws and the corresponding ends of the fiber layer.

10. In a machine for making a brush by twisting two longitudinal wires having between them a layer of transverse brush fibers with the ends of the fiber layer spaced from the ends of the wires, the combination of two longitudinally spaced pairs of jaws with the jaws of each pair at opposite sides of a common longitudinal axis, two means serving respectively to carry the said pairs of jaws one of which means is rotatable about the said axis and one of which means is longitudinally movable, means for causing the jaws of the two pairs to respectively engage the two wires near the ends thereof, two controlling devices carried respectively by the said two carrying means and respectively engageable with the two wires at positions spaced from the corresponding pairs of jaws and near the corresponding ends of the fiber layer to prevent twisting of the wires between the said controlling devices and the corresponding pairs of jaws, means for effecting rotation of the said rotatable carrying means and the jaws and controlling device carried thereby to twist the wires between the two said controlling devices with resultant locking of the fibers in place, the said twisting of the wires causing longitudinal movement of the said longitudinally movable carrying means, and means operable during the said rotation and dependent upon the said longitudinal movement of the said longitudinally movable carrying means for moving the two controlling devices relatively to the corresponding carrying means and out of engagement with the two wires while the jaws of the said pairs remain in engagement with the said wires, the movement of the controlling devices by the last said means enabling the pairs of jaws during continuation of the said rotation about the said longitudinal axis to additionally twist the wires between the said pairs of jaws and the ends of the fiber layer.

11. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of each pair at opposite sides of the said axis, means for causing the jaws of the two pairs to respectively engage the two wires near the ends thereof, two controlling devices carried respectively by the said spindle and the said slide and respectively engageable with the two wires at positions spaced from the corresponding pairs of jaws and near the corresponding ends of the fiber layer to prevent twisting of the wires between the said controlling devices and the corresponding pairs of jaws, means for rotating the said spindle and the jaws and controlling device carried thereby to twist the wires between the two said controlling devices with resultant locking of the fibers in place, the said twisting of the wires causing longitudinal movement of the said slide toward the said spindle, and means operable during the spindle rotation and dependent upon the longitudinal slide movement caused by the said twisting for transversely moving the two controlling devices relatively to the said spindle and the said slide and out of engagement with the two wires while the jaws of the said pairs remain in engagement with the said wires, the last said means enabling the pairs of jaws during continuation of the spindle rotation about the said longitudinal axis to additionally twist the wires between the said pairs of jaws and the ends of the fiber layer.

12. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide in fixed longitudinal relationship therewith, the jaws of the said two pairs being respectively engageable with and disengageable from the two wires near the ends thereof, two controlling devices carried respectively by the said spindle and the said slide in fixed longitudinal relationship therewith which controlling devices are respectively engageable with and disengageable from the two wires at positions spaced from the corresponding pairs of jaws and near the corresponding ends of the fiber layer, the said controlling devices when engaged with the wires serving to prevent twisting of the wires between the said controlling devices and the corresponding pairs of jaws, means for rotating the said spindle and the jaws and controlling device carried thereby to twist the wires, and means for automatically effecting operation in the following sequence, (a) causing both controlilng devices and both pairs of jaws to be in simultaneous engagement with the wires, (b) starting the rotation of the spindle, (c) simultaneously disengaging both controlling devices from the wires during spindle rotation and upon completion of twisting of the wires between the said controlling devices and while both pairs of jaws remain in engagement with the said wires, (d) simultaneously disengaging both pairs of the jaws from the wires upon completion of twisting of the end portions of the wires between the ends of the fiber layer and the said pairs of jaws, (e) stopping the rotation of the spindle.

13. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide in fixed longitudinal relationship therewith, the jaws of the said two pairs being respectively engageable with and disengageable from the two wires near the ends thereof, two controlling devices carried respectively by the said spindle and the said slide in fixed longitudinal relationship therewith which controlling devices are respectively engageable with and disengageable from the two wires at positions spaced from the corresponding pairs of jaws and near the corresponding ends of the fiber layer, the said controlling devices when engaged with the wires serving to prevent twisting of the wires between the said controlling devices and the corresponding pairs of jaws, means for rotating the said spindle and the jaws and controlling device carried thereby to twist the wires, and means for automatically effecting operation in the following sequence, (a) simultaneously engaging both controlling devices with the wires, (b) simultaneously engaging both pairs of jaws with the wires while the controlling devices remain in engagement therewith, (c) starting the rotation of the spindle, (d) simultaneously disengaging both controlling devices from the wires during spindle rotation and upon completion of twisting of the wires between the said controlling devices and while both pairs of jaws remain in engagement with the said wire, (e) simultaneously disengaging both pairs of jaws from the wires upon completion of twisting of the end portions of the wires between the ends of the fiber layer and the said pairs of jaws, (f) stopping the rotation of the spindle.

14. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, and two wire engaging means carried respectively by the spindle and the slide and each including: a transverse pivot element, a pair of jaws in opposed relationship and engageable with the corresponding wires near the ends thereof, a longitudinal lever carrying one of the jaws and pivoted on the said pivot element which lever is movable to cause the jaws to engage or disengage the wires, a pair of controllers pivoted on the said pivot element and having oppositely disposed portions engageable with the wires at positions longitudinally spaced from the jaws, and means for simultaneously moving the controllers of the said pair independently of the said jaw lever and in opposite directions so as to cause the said wire engaging portions of the said controllers to engage or disengage the wires.

15. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, and two wire engaging means carried respectively by the spindle and slide and each including: a transverse pivot element, a pair of jaws in opposed relationship and engageable with the corresponding wires near the ends thereof, a longitudinal lever carrying one of the jaws and pivoted on the said pivot element which lever is movable to cause the jaws to engage or disengage the corresponding end portions of the wires, a pair of controllers pivoted on the said pivot element and having oppositely disposed portions engageable with the wires at positions longitudinally spaced from the jaws, the said controllers being U-shaped in transverse section and each of them having one leg in engagement with the pivot element above the jaw lever and having the other leg in engagement with the pivot element below the jaw lever, and means for simultaneously moving the controllers of the said pair independently of the said jaw lever and in opposite directions so as to cause the said wire engaging portions of the said controllers to engage or disengage the wires.

16. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, and two wire engaging means carried respectively by the spindle and slide and each including: a transverse pivot element, a pair of jaws in opposed relationship and engageable with the corresponding wires near the ends thereof, a longitudinal lever carrying one of the jaws and pivoted on the said pivot element which lever is movable to cause the jaws to engage or disengage the corresponding end portions of the wires, a pair of controllers pivoted on the said pivot element and having oppositely disposed portions engageable with the wires at positions longitudinally spaced from the jaws, the said controllers being U-shaped in transverse section and each of them having one leg in engagement with the pivot element above the jaw lever and having the other leg in engagement with the pivot element below the jaw lever, and means including a longitudinally movable bar and toggle links connecting the bar with the controllers of the said pair for simultaneously moving the said controllers independently of the said jaw lever and in opposite directions so as to cause the said wire engaging portions of the said controllers to engage or disengage the wires.

17. In a machine for making a brush by twisting two longitudinal wires having between them a layer of transverse brush fibers with the ends of the fiber layer spaced from the ends of the wires, the combination of a longitudinally movable tailstock slide, a headstock spindle rotatable about a longitudinal axis, a wire engaging means carried by the slide and including: a vertical pivot element, a pair of jaws in opposed relationship and engageable with the corresponding wires near the ends thereof, a longitudinal lever carrying one of the jaws and pivoted on the said pivot element which lever is movable to cause the jaws to engage or disengage the wires and a pair of controllers pivoted on the said pivot element and having oppositely disposed portions engageable with the wires at positions longitudinally spaced from the jaws, wire engaging means carried by the spindle and including: a transverse pivot element, a pair of jaws in opposed relationship and engageable with the corresponding wires near the ends thereof, longitudinal levers respectively carrying the jaws which levers are pivoted on the said pivot element and are movable in opposite directions to cause the jaws to engage or disengage the wires and a pair of controllers pivoted on the said pivot element and having oppositely disposed portions engageable with the wires at positions longitudinally spaced from the jaws, means for simultaneously moving the jaw lever on the slide and the jaw lever on the spindle to cause the jaws of both pairs to engage and disengage the wires, and means for simultaneously moving the controllers of both of the said pairs independently of the said jaw levers and in opposite directions so as to cause the said wire engaging portions of the said controllers to engage or disengage the wires.

18. A machine as set forth in claim 17, wherein the controllers of each pair are U-shaped in transverse section, each of the controllers on the slide having one leg in engagement with the corresponding pivot element and above the jaw lever and having the other leg in engagement with the said pivot element below the jaw lever and each of the controllers on the spindle having one leg in engagement with the corresponding pivot element and above both jaw levers and having the other leg in engagement with the said pivot element and below both jaw levers.

19. A machine as set forth in claim 17, wherein the jaw levers on the spindle have longitudinal slots therein, wherein the means for moving the controllers on the spindle includes a longitudinally movable bar and toggle links respectively above and below the jaw levers and connecting the bar with the controllers for moving them, and wherein there is a vertical pin connecting the said toggle links above and below the jaw levers which pin extends through the said slots in the jaw levers.

20. In a machine for making a brush by twisting two longitudinal wires having between them a layer of transverse brush fibers with the ends of the fiber layer spaced from the ends of the wires, the combination of two longitudinally spaced first and second pairs of jaws respectively engageable with the two wires near the ends thereof, devices engageable with the end portions of the wires at locations adjacent the ends of the fiber layer and shaped to serve upon wire engagement to form and set the last said portions of the two wires with fiber controlling shapes, means for causing the said devices to engage the wires so as to form the wires with the said shapes, means for causing the jaws of both pairs of engage the wires, and means operable after engagement of the said jaws and the said devices with the wires for effecting relative rotation about a longitudinal axis between the first and second pairs of jaws and for twisting the wires with resultant locking of the fibers in place.

21. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with the two wires near the ends thereof, devices engageable with the end portions of the wires at locations adjacent the ends of the fiber layer and shaped to serve upon wire engagement to form and set the last said portions of the two wires with fiber controlling shapes, means for causing the said devices to engage the wires so as to form the wires with the said shapes, means for causing the jaws of both pairs to simultaneously engage the wires, and means operable after engagement of the said jaws and the said devices with the wires for rotating the spindle and the jaws carried thereby to effect twisting.

22. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with and disengageable from the two wires near the ends thereof, two pairs of controllers carried respectively by the spindle and the slide with the controllers of the said pairs movable in opposite directions for engagement with the wires at positions closely adjacent the ends of the fiber layer, the controllers of each pair being shaped to serve upon wire engagement to form and set the two wires with fiber controlling shapes, means for rotating the spindle and the controllers and jaws carried thereby to effect twisting, means for moving the controllers of the two pairs simultaneously into engagement with the wires prior to spindle rotation and wire twisting so as to form the wires with the said shapes and for moving the said controllers simultaneously out of engagement with the wires independently of the jaws after partial wire twisting, and means for causing the jaws of the two pairs to simultaneously engage the wires prior to spindle rotation and wire twisting and to substantially simultaneously disengage the wires after complete wire twisting.

23. The hereindescribed method of making a brush comprising two twisted wires with a layer of brush fibers between them, the said method including the formation of set bends in the end portions of the wires at locations adjacent the ends of the fiber layer to limit subsequent movement of the fibers at the ends of the said layer longitudinally of the wires, and effecting relative rotation between the end portions of the wires to cause twisting of wires about one another and about the said layer of fibers to grip and lock the fibers in the said layer.

24. The hereindescribed method of making a brush comprising two twisted wires with a layer of brush fibers between them, the said method including the formation of a layer of fibers between two longitudinal wires, forming set bends in the end portions of the wires at locations adjacent the ends of the fiber layer to limit subsequent movement of the fibers at the ends of the said layer longitudinally of the wires, and effecting relative rotation between the opposite end portions of the wires to cause twisting of the wires about one another and about the said layer of fibers to grip and lock the fibers in the said layer.

25. The hereindescribed method of making a brush comprising two twisted wires with a layer of transverse brush fibers between them, the said method including the formation of a layer of fibers positioned between two longitudinal wires and spaced from the ends of said wires, engaging the end portions of the wires at positions adjacent the ends of the fiber layer to form set bends in the said engaged portions of the wires, engaging the wires at portions near the ends thereof, disengaging the wires at the first said engaged portions, and effecting relative rotation between the end portions of the wires to cause twisting of the wires about one another and about the said layer of fibers to grip and lock the fibers in the said layer, the said forming of set bends in the said portions of the wires adjacent the ends of the fiber layer serving to limit longitudinal movement of the fibers in the end portions of the layer during twisting.

26. The hereindescribed method of making a brush comprising two twisted wires with a layer of transverse brush fibers between them, the said method including the formation of a layer of fibers positioned between two longitudinal wires and spaced from the ends of the said wires, engaging the wires at first portions thereof adjacent the ends of the fiber layer to initially prevent longitudinal movement of the fibers in the end portions of the layer and to form set bends in the said engaged portions of the wires, engaging the wires at second portions near the ends thereof, subsequently effecting relative rotation between said first and second engaged portions of the wires at one end of the fiber layer and said first and second engaged portions of the wires at the other end of the fiber layer so as to cause initial twisting of the wires in the twisting direction between said first engaged portions thereof to lock in place the major portions of the fibers in the said layer while preventing twisting of said end portions of the wires between first engaged portions and said second engaged portions, and disengaging the wires at said first engaged portions while relative rotation continues between said second engaged portions thereof so as to cause twisting of the said end portions of the wires, the said forming of set bends in the said portions of the wires adjacent the ends of the fiber layer serving to limit longitudinal movement of the fibers in the end portions of the layer upon disengagement of the wires at the first said engaged portions thereof.

27. In a machine for making a brush by twisting two longitudinal wires having between them a layer of transverse brush fibers with the ends of the fiber layer spaced from the ends of the wires, the combination of two longitudinally spaced first and second pairs of jaws respectively engageable with the two wires near the ends thereof, devices engageable with the end portions of the wires at locations adjacent the ends of the fiber layer and shaped to serve upon wire engagement to pretwist the said portions of the two wires in the twisting direction, means for causing the said devices to engage the wires so as to effect the said pretwisting, means for causing the jaws of both pairs to engage the wires, and means operable after engagement of the said jaws and the said devices with the wires for effecting relative rotation about a longitudinal axis between the first and second pairs of jaws and for twisting the wires with resultant locking of the fibers in place.

28. In a machine for making a brush by twisting two longitudinal wires having between them a layer of transverse brush fibers with the ends of the fiber layer spaced from the ends of the wires, the combination of two longitudinally spaced pairs of jaws respectively engageable with the two wires near the ends thereof, two pairs of controllers respectively adjacent the said pairs of jaws with the controllers of the said pairs movable in opposite directions for engagement with the wires at positions closely adjacent the ends of the fiber layer, the controllers of each pair being shaped to serve upon wire engagement to pretwist in the twisting directions those portions of the wires that are closely adjacent the ends of the fiber layer, means for moving the controllers of the two pairs simultaneously into engagement with the wires so as to pretwist them, means for causing the jaws of the two pairs to engage the wires after engagement of the pairs of controllers with the wires, means operable after engagement of the controllers and the jaws with the wires for effecting relative rotation about a longitudinal axis between one pair of jaws together with the corresponding pair of controllers and the other pair of jaws together with the corresponding pair of controllers so as to effect wire twisting between the pairs of controllers, and means operable while the jaws of both pairs remain engaged with the wires for transversely separating the controllers of both pairs so as to disengage them from the wires, the disengagement of the controllers from the wires serving to enable the said pairs of jaws upon additional relative rotation about the said longitudinal axis to additionally twist the wires between the said pairs of jaws and the corresponding ends of the fiber layer.

29. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with and disengageable from the two wires near the ends thereof, two pairs of controllers carried respectively by the spindle and the slide with the controllers of the said pairs movable in opposite directions for engagement with the wires at positions closely adjacent the ends of the fiber layer, the controllers of each pair being shaped to serve upon wire engagement to pretwist in the twisting directions those portions of the wires that are closely adjacent the ends of the fiber layer, means for rotating the spindle and the controllers and jaws carried thereby to effect twisting, means for moving the controllers of the two pairs simultaneously into engagement with the wires prior to spindle rotation and wire twisting so as to form the wires with the said pretwist and for moving the said controllers simultaneously out of engagement with the wires independently of the jaws after partial wire twisting, and means for causing the jaws of the two pairs to simultaneously engage the wires prior to spindle rotation and wire twisting and to substantially simultaneously disengage the wires after complete wire twisting.

30. The hereindescribed method of making a brush comprising two twisted wires with a layer of transverse brush fibers between them, the said method including the formation of a layer of fibers positioned between two longitudinal wires and spaced from the ends of the said wires, engaging the end portions of the wires at locations adjacent the ends of the said fiber layer and thereby pretwisting in the twisting direction the last said portions of the wires so as to limit longitudinal movement of the fibers in the end portions of the layer during subsequent twisting, and subsequently effecting relative rotation between the ends of the wires so as to cause twisting of the wires in the said twisting direction and so as to thereby lock the fibers in place.

31. The hereindescribed method of making a brush comprising two twisted wires with a layer of transverse brush fibers between them, the said method including the formation of a layer of fibers positioned between two longitudinal wires and spaced from the ends of the said wires, engaging the wires at first portions thereof adjacent the ends of the fiber layer to initially prevent longitudinal movement of the fibers in the end portions of the layer and thereby pretwisting in the twisting direction the portions of the wires immediately adjacent the ends of the fiber layer, engaging the wires at second portions near the ends thereof, subsequently effecting relative rotation between said first and second engaged portions of the wires at one end of the fiber layer and said first and second engaged portions of the wires at the opposite end of the fiber layer so as to cause initial twisting of the wires in the said twisting direction between said first engaged portions thereof to lock in place the major portions of the fibers in the said layer while preventing twisting of the end portions of the wires between said first engaged portions and said second engaged portions, and disengaging the wires at said first engaged portions while realtive rotation continues between the said second engaged portions thereof so as to cause twisting of the end portions of the wires beyond the fiber layer, the said pretwisting of the said portions of the wires immediately adjacent the ends of the fiber layer serving to limit longitudinal movement of the fibers in the end portions of the layer upon disengagement of the wires at said first engaged portions thereof.

32. In a machine for making a brush by twisting two longitudinal wires having between them a layer of transverse brush fibers with the ends of the fiber layer spaced from the ends of the wires, the combination of two longitudinally spaced first and second pairs of jaws respectively engageable with the two wires near the ends thereof, devices engageable with the wires at portions thereof adjacent the ends of the fiber layer and shaped to serve upon wire engagement to form and set the two wires with humps extending in opposite directions, means for causing the said devices to engage the wires so as to form and set the said humps, means for causing the jaws of both pairs to engage the wires, and means operable after engagement of the said jaws and the said devices with the wires for effecting relative rotation about a longitudinal axis between the first and second pairs of jaws and for twisting the wires with resultant locking of the fibers in place.

33. In a machine for making a brush by twisting two longitudinal wires having between them a layer of transverse brush fibers with the ends of the fiber layer spaced from the ends of the wires, the combination of two longitudinally spaced pairs of jaws respectively engageable with the two wires near the ends thereof, two pairs of controllers respectively adjacent the said pairs of jaws with the controllers of the said pairs movable in opposite directions for engagement with the wires at positions closely adjacent the ends of the fiber layer, the controllers of each pair being shaped to serve upon wire engagement to form and set the two wires with humps extending in opposite directions, means for moving the controllers of the two pairs simultaneously into engagement with the wires prior to spindle rotation and wire twisting so as to form and set the said humps, means for causing the jaws of the two pairs to engage the wires after engagement of the pairs of controllers with the wires, means operable after engagement of the controllers and the jaws with the wires for effecting relative rotation about a longitudinal axis between one pair of jaws together with the corresponding pair of controllers and the other pair of jaws together with the corresponding pair of controllers so as to effect wire twisting between the said pairs of controllers, and means operable while the jaws of both pairs remain engaged with the wires for transversely separating the controllers of both pairs so as to disengage them from the wires, the disengagement of the controllers from the wires serving to enable the said pairs of jaws upon additional relative rotation about the said longitudinal axis to additionally twist the wires between the said pairs of jaws and the corresponding ends of the fiber layer.

34. In a machine for making a brush by twisting two longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with and disengageable from the two wires near the ends thereof, two pairs of controllers carried respectively by the spindle and the slide with the controllers of the said pairs movable in opposite directions for engagement with the wires at positions closely adjacent the ends of the fiber layer, the controllers of each pair being shaped to serve upon wire engagement to form and set the two wires with humps extending in opposite directions, means for rotating the spindle and the controllers and jaws carried thereby to effect twisting, means for moving the controllers of the two pairs simultaneously into engagement with the wires prior to spindle rotation and wire twisting so as to form the said humps and for moving the said controllers simultaneously out of engagement with the wires independently of the jaws after partial wire twisting, and means for causing the jaws of the two pairs to simultaneously engage the wires prior to spindle rotation and wire twisting and to substantially simultaneously disengage the wires after complete wire twisting.

35. A machine as set forth in claim 34, wherein the two controllers of each pair are also shaped to locate the said humps in the two wires in positions that are spaced apart in a direction that is transverse of the directions in which the humps extend.

36. A machine as set forth in claim 34, wherein the means causing the engagement and disengagement of the jaws with the wires serves to engage the jaws with the wires after the controllers have been engaged with the wires.

37. In a machine for making a brush, the combination of a headstock spindle rotatable about a longitudinal axis, a longitudinally movable tailstock slide, means for forming a layer of transverse brush fibers having its end zones thicker than the other portions thereof and for positioning the said layer between two longitudinal wires with the ends of the layer spaced from the ends of the wires, means for moving the wires and the fiber layer to positions between the spindle and the slide, two pairs of jaws carried respectively by the said spindle and the said slide with the jaws of the two pairs respectively engageable with the two wires near the ends thereof, two pairs of controllers carried respectively by the spindle and the slide and engageable with the two wires at positions closely adjacent the ends of the fiber layer, the controllers of each pair being movable toward each other for wire engagement and being shaped to serve upon such engagement to form and set the two wires with humps extending in opposite directions, means for rotating the spindle and the controllers and jaws carried thereby to effect twisting, means for moving the controllers of the two pairs simultaneously into engagement with the wires prior to spindle rotation and wire twisting so as to form the said humps and for moving the said controllers simultaneously out of engagement with the wires independently of the jaws after partial wire twisting so as to enable some of the fibers in the thicker end zones of the layer to move longitudinally into the spaces provided between the said humps, and means for causing the jaws of the two pairs to simultaneously engage the wires prior to spindle rotation and wire twisting and to substantially simultaneously disengage the wires after complete wire twisting.

38. The hereindescribed method of making a brush comprising two twisted wires with a layer of transverse brush fibers between them, the said method including the formation of a layer of fibers positioned between two longitudinal wires and spaced from the ends of the said wires, engaging the wires at portions thereof adjacent the ends of the said fiber layer to form the said portions with set humps extending away from each other and providing spaces between them for receiving some of the fibers in the end portions of the layer, effecting relative rotation between the said portions of the wires so as to cause twisting of the wires and to thereby lock the fibers in place, and engaging the wires near the ends thereof to subsequently effect relative rotation for twisting the end portions of the said wires, the last said twisting of the wires serving to close the said spaces between the wire humps and thus serving to limit longitudinal movement of the fibers in the end portions of the layers.

39. The hereindescribed method of making a brush comprising two twisted wires with a layer of transverse brush fibers between them, the said method including the formation of a layer of fibers positioned between two longitudinal wires and spaced from the ends of the said wires, engaging the wires at first portions thereof adjacent the ends of the fiber layer to initially prevent longitudinal movement of the fibers in the end portions of the layer and to form the said portions with set humps extending away from each other and providing spaces between them for receiving some of the fibers in the end portions of the layer, engaging the wires at second portions near the ends thereof, subsequently effecting relative rotation between said first and second engaged portions of the wires at one end of the fiber layer and said first and second engaged portions of the wires at the other end of the fiber layer so as to cause initial twisting of the wires between said first engaged portions thereof to lock in place the major portions of the fibers in the said layer while preventing twisting of the end portions of the wires between said first engaged portions and said second engaged portions, and disengaging the wires at said first engaged portions while relative rotation continues between the said second engaged portions thereof so as to cause twisting of the said end portions of the wires, the said twisting of the end portions of the wires serving to close the spaces between the wire humps and thus serving to limit longitudinal movement of the fibers in the end portions of the layer.

40. The hereindescribed method of making a brush comprising two twisted wires with a layer of transverse brush fibers between them, the said method including the formation of a layer of fibers positioned between two longitudinal wires with the said layer having its end zones thicker than the other portions thereof and spaced from the ends of the wires, engaging the wires at portions thereof adjacent the ends of the fiber layer to initially prevent longitudinal movement of the fibers in the end portions of the layer and to form the wires with set humps extending away from each other, engaging the wires near the ends thereof to effect relative rotation and causing twisting of the wires between the first said engaged portions thereof, disengaging the wires at the first said engaged portions while twisting continues so as to enable some of the fibers in the thicker end zones of the fiber layer to move longitudinally into the spaces provided between the said wire humps, and continuing the relative rotation and the twisting of the wires to cause the closing of the said spaces and the engagement of the last said fibers by the wires to limit longitudinal movement of the said fibers and to grip and lock the said fibers.

41. In a machine for making a brush by twisting two longitudinal wires having between them a layer of transverse brush fibers with the ends of the fiber layer spaced from the ends of the wires, the combination of two longitudinally spaced first and second pairs of jaws respectively engageable with the two wires near the ends thereof, devices engageable with the wires and tending to move toward each other the portions thereof that are immediately adjacent the fiber layer at opposite sides thereof so as to enable said wire portions to more firmly hold the fibers, means for causing the operation of said devices for moving the wires as last aforesaid, means for causing the jaws of both pairs to engage the wires, and means operable after engagement of the said jaws and the said devices with the wires for effecting relative rotation about a longitudinal axis between the first and second pairs of jaws and for twisting the wires with resultant locking of the fibers in place.

42. In a machine for making a brush by twisting two longitudinal initially straight wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with and disengageable from the two wires near the ends thereof, two pairs of controllers carried respectively by the spindle and the slide with the controllers of the said pairs movable in opposite directions for engagement with the wires at positions respectively spaced from the jaws, two cooperating means included respectively in the two controllers of each pair and held in fixed relationship therewith which means are shaped to serve upon wire engaging movement of the controllers for bending the said wires so as to move the fiber engaging portions thereof toward each other and into firmer engagement with the fibers, means for rotating the spindle and the controllers and jaws carried thereby to effect twisting, means for moving the controllers of the two pairs simultaneously into engagement with the wires prior to spindle rotation and wire twisting and for moving the said controllers out of engagement with the wires after partial wire twisting, and means for causing the jaws of the two pairs to simultaneously engage the wires subsequently to the said controller engagement and prior to wire twisting and to substantially simultaneously disengage the wires after complete wire twisting.

43. The hereindescribed method of making a brush comprising two twisted wires with a layer of transverse brush fibers between them, the said method including the formation of a layer of fibers positioned between two longitudinal wires and spaced from the ends of the said wires, applying force tending to move toward each other the portions thereof that are immediately adjacent the fiber layer at opposite sides thereof so as to enable said wire portions to more firmly hold the fibers, and effecting relative rotation between the end portions of the wires to cause twisting of the wires about one another and about the said layer of fibers to grip and lock the fibers in the said layer.

44. The hereindescribed method of making a brush comprising two twisted wires with a layer of transverse brush fibers between them, the said method including the formation of a layer of fibers positioned between two longitudinal wires and spaced from the ends of the said wires, engaging the wires at first portions thereof adjacent the ends of the fiber layer to initially prevent longitudinal movement of the fibers in the end portions of the layer and to bend the fiber engaging portions of the said wires toward each other so as to firmly hold the fibers in place, engaging the wires at second portions near the ends thereof, subsequently effecting relative rotation between said first and second engaged portions of the wires at one end of the fiber layer and said first and second engaged portions of the wires at the other end of the fiber layer so as to cause initial twisting of the wires between said first engaged portions thereof to lock in place the major portions of the fibers in the said layer while preventing twisting of the end portions of the wires between said first engaged portions and said second engaged portions, and disengaging the wires at said first engaged portions while relative rotation continues between said second engaged portions thereof so as to cause twisting of said end portions of the wires.

45. In a machine for making a brush by twisting two longitudinally initially straight wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with and disengageable from the two wires near the ends thereof, two pairs of controllers carried respectively by the spindle and the slide with the controllers of the said pairs movable in opposite directions for engagement with the wires at positions respectively spaced from the jaws, two cooperating means included respectively in the two controllers of each pair and held in fixed relationship therewith which means are shaped to serve upon wire engaging movement of the controllers for bending the said wires so as to move their end portions into contact with each other, means for rotating the spindle and the controllers and jaws carried thereby to effect twisting, means for moving the controllers of the two pairs simultaneously into engagement with the wires prior to spindle rotation and wire twisting and for moving the said controllers out of engagement with the wires after partial wire twisting and while the jaws remain engaged with the wires, and means for causing the jaws of the two pairs to simultaneously engage the wires subsequently to the said controller engagement and prior to wire twisting and to substantially simultaneously disengage the wires after complete wire twisting.

46. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis, a longitudinally movable tailstock slide, two wire engaging means carried respectively by the said spindle and the said slide, means for applying force tending to move the slide away from the spindle which means is initially inoperable, means for releasing the last said means to cause operation thereof, means for causing the two wire engaging means to simultaneously engage the wires, means for rotating the spindle and the wire engaging means carried thereby to effect twisting of the wires, and means automatically operable substantially simultaneously with the engagement of the wires by the wire engaging means and prior to the rotation of the spindle for operating the said releasing means to cause the force applying means to tend to move the slide and to thus tension the wires prior to spindle rotation and prior to twisting.

47. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with the two wires near the ends thereof, two pairs of controllers carried respectively by the spindle and the slide and engageable with the two wires at positions closely adjacent the ends of the fiber layer, means for applying force tending to move the slide away from spindle which means is initially inoperable, means for releasing the last said means to cause operation thereof, means for causing the controllers of both pairs to simultaneously engage the wires, means for subsequently causing the jaws of both pairs to simultaneously engage the wires, means for rotating the spindle and the controllers and jaws carried thereby to effect twisting of the wires, and means automatically operable substantially simultaneously with the engagement of the wires by the controllers and prior to the engagement of the wires by the jaws and prior to the rotation of the spindle for operating the said releasing means to cause the force applying means to tend to move the slide and to thus tension the wires prior to jaw engagement and prior to spindle rotation and prior to twisting.

48. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with the two wires near the ends thereof, two pairs of controllers carried respectively by the spindle and the slide and engageable with the two wires at positions closely adjacent the ends of the fiber layer, the said controllers of each pair including members which upon wire engagement bend the said wires to move the fiber engaging portions thereof toward each other and into firmer engagement with the fibers, means for applying force tending to move the slide away from spindle which means is initially inoperable, means for releasing the last said means to cause operation thereof, means for causing the controllers of both pairs to simultaneously engage the wires, means for subsequently causing the jaws of both pairs to simultaneously engage the wires, means for rotating the spindle and the controllers and jaws carried thereby to effect twisting of the wires, and means automatically operable substantially simultaneously with the engagement of the wires by the controllers and prior to the engagement of the the wires by the jaws and prior to the rotation of the spindle for operating the said releasing means to cause the force applying means to tend to move the slide and to thus tension the wires prior to jaw engagement and prior to spindle rotation and prior to twisting.

49. The hereindescribed method of making a brush comprising two twisted wires with a layer of transverse brush fibers between them, the said method including the formation of a layer of fibers positioned between two longitudinal wires and spaced from the ends of the said wires, engaging the wires at first portions thereof adjacent the ends of the fiber layer to initially prevent longitudinal movement of the fibers in the end portions of the layer and to bend the fiber engaging portions of the said wires toward each other so as to firmly hold the fibers in place and to tension the said wires between said engaged portions thereof, engaging the wires at second portions near the ends thereof, subsequently effecting relative rotation between said first and second engaged portions of the wires at one end of the fiber layer and said first and second engaged portions of the wires at the other end of the fiber layer so as to cause initial twisting of the wires between said first engaged portions thereof to lock in place the major portions of the fibers in the said layer while preventing twisting of the end portions of the wires between said first engaged portions and said second engaged portions, and disengaging the wires at said first engaged portions while relative rotation continues between said second engaged portions thereof so as to cause twisting of said end portions of the wires.

50. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis, a longitudinal movable tailstock slide, two wire engaging means carried respectively by the said spindle and the said slide, means for applying force tending to move the slide away from the spindle, a lever adjacent the slide and pivoted for movement about a fixed transverse axis, means for holding the lever in a position toward the spindle, a flexible tension member connecting the lever and the slide and serving to prevent movement of the slide away from the spindle when the lever is in its said position, means for causing the two wire engaging means to simultaneously engage the wires, means for rotating the spindle and the wire engaging means carried thereby to effect twisting of the wires, and means automatically operable substantially simultaneously with the engagement of the wires by the wire engaging means and prior to the rotation of the spindle for releasing the lever holding means so that the lever is movable out of its said position and away from the spindle, the last said means releasing the tension member so that it no longer prevents movement of the slide and so that the said force applying means tends to move the slide and to thus tension the wires prior to spindle rotation and prior to twisting.

51. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis, a longitudinally movable tailstock slide, two pairs of jaws carried respectively by the said spindle and the said slide with the jaws of the two pairs respectively engageable with the two wires near the ends thereof, two pairs of controllers carried respectively by the spindle and the slide and engageable with the two wires at positions closely adjacent the ends of the fiber layer, means for applying force tending to move the slide away from the spindle, a lever adjacent the slide and pivoted for movement about a fixed transverse axis, means for holding the lever in a position toward the spindle, a flexible tension member connecting the lever and the slide and serving to prevent movement of the slide away from the spindle when the lever is in its said position, means for causing the controllers of both pairs to simultaneously engage the wires, means for rotating the spindle and the controllers and jaws carried thereby to effect twisting of the wires, means automatically operable substantially simultaneously with the engagement of the wires by the controllers and prior to the rotation of the spindle for releasing the lever holding means so that the lever is movable out of its said position and away from the spindle, the last said means releasing the tension member so that it no longer prevents movement of the slide and so that the said force applying means tends to move the slide and to thus tension the wires prior to spindle rotation and prior to twisting, and means dependent upon movement of the said lever after release thereof by the said lever holding means for causing the jaws of both pairs to simultaneously engage the wires.

52. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction, a longitudinally movable tailstock slide, two wire engaging means carried respectively by the said spindle and the said slide, means for causing the two wire engaging means to simultaneously engage the wires, means connected with the spindle for rotating it in the said forward direction and then in the said reverse direction, means for causing the said spindle connected means to rotate the spindle in the said forward direction to effect twisting of the wires, and means automatically operable upon the completion of forward rotation and of twisting and while the two wire engaging means remain engaged with the wires for causing the spindle connected means to rotate the spindle in the reverse direction to an extent approximately the same as the extent to which the wires tend to untwist as the result of their inherent resiliency.

53. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction, a longitudinally movable tailstock slide, two wire engaging means carried resepctively by the said spindle and the said slide, means for causing the two wire engaging means to simultaneously engage the wires, means connected with the spindle for rotating it in the said forward direction and then in the said reverse direction, means for causing the said spindle connected means to rotate the spindle in the said forward direction to effect twisting of the wires, the rotation of the spindle to effect twisting causing longitudinal movement of the tailstock slide, and means operable by the tailstock slide after a predetermined longitudinal movement thereof and while the two wire engaging means remain engaged with the wires for causing the spindle connected means to rotate the spindle in the reverse direction to an extent approximately the same as the extent to which the wires tend to untwist as the result of their inherent resiliency.

54. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting and then in the said reverse direction, means automatically operable upon the completion of twisting for reversing the motor and for thus reversing the rotation of the spindle, and means dependent upon the reverse rotation of the spindle to its said centered position for stopping the reverse rotation of the motor.

55. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting, the rotation of the spindle to effect twisting causing longitudinal movement of the tailstock slide, means operable by the tailstock slide after a predetermined longitudinal movement for causing the motor to rotate in the reverse direction with resultant rotation of the spindle in the reverse direction, and means dependent upon the reverse rotation of the spindle to its said centered position for stopping the reverse rotation of the motor.

56. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting and then in the said reverse direction, means automatically operable upon the completion of twisting for reversing the motor and for thus reversing the rotation of the spindle, means operable after an initial rotation of the motor in the reverse direction for causing the motor to rotate at less than its normal speed, and means dependent upon the reverse rotation of the spindle to its said centered position for stopping reverse rotation of the motor.

57. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting and then in the said reverse direction, means automatically operable upon the completion of twisting for reversing the motor and for thus reversing the rotation of the spindle, a switch serving when operated to cause the motor to rotate in the reverse direction at less than its normal speed, a disc rotatable with the motor, a member frictionally engageable with the disc during forward and reverse rotation and movable upon reverse rotation to operate the said switch, and means dependent upon the reverse rotation of the spindle to its said centered position for stopping reverse rotation of the motor.

58. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a spindle control member rotatable with the spindle and having a single tooth facing in the reverse direction, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting and then in the said reverse direction, means automatically operable upon the completion of twisting for reversing the motor and for thus reversing the rotation of the spindle, a movable latch biased for engagement with the said spindle control member and yieldable to enable the tooth of the said member to move past the latch during forward rotation, and means effective upon the engagement of the tooth with the latch during reverse rotation for stopping the spindle in its said centered position.

59. A machine as set forth in claim 58, having a switch operable by the said latch upon engagement thereof by the said tooth and serving upon such operation to stop the reverse rotation of the motor.

60. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a spindle control member rotatable with the spindle and having a single tooth facing in the reverse direction, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting and then in the said reverse direction, means automatically operable upon the completion of twisting for reversing the motor and for thus reversing the rotation of the spindle, a latch having an end portion engageable with the control member which latch is movable toward and from the spindle axis and is also movable longitudinally, biasing means serving to maintain the said end portion of the latch in engagement with the said member to enable the tooth of the said member to move past the latch during forward rotation, the last said means also serving to bias the latch longitudinally in a direction corresponding to forward rotation of the spindle, means effective upon the engagement of the tooth with the end portion of the latch and upon the resultant longitudinal movement of the latch in opposition to its bias for stopping the spindle in its centered position.

61. A machine as set forth in claim 60, having a switch operable by the said latch upon the last said longitudinal movement thereof and serving upon such operation to stop the reverse rotation of the motor.

62. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a spindle control member rotatable with the spindle and having a single tooth facing in the reverse direction, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting and then in the said reverse direction, means automatically operable upon the completion of twisting for reversing the motor and for thus reversing the rotation of the spindle, a movable latch biased for engagement with the said spindle control member and yieldable to enable the tooth of the said member to move past the latch during forward rotation, a brake for stopping the reverse rotation of the spindle, and means effective upon the engagement of the tooth with the latch during reverse rotation for applying the brake to stop the spindle in its said centered position.

63. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a spindle control member rotatable with the spindle and having a single tooth facing in the reverse direction, a longitudinally movable tailstock slide, two wire engaging means carried respectively by the said spindle and the said slide, means for causing the two wire engaging means to simultaneously engage the wires, a reversible electric motor connected with the spindle for rotating it in the said forward direction to effect twisting and then in the said reverse direction, means automatically operable upon the completion of twisting for reversing the motor and for thus reversing the rotation of the spindle, a latch having an end portion engageable with the control member which latch is movable toward and from the spindle axis and is also movable longitudinally, biasing means serving to maintain the said end portion of the latch in engagement with the said member to enable the tooth of the said member to move past the latch during forward rotation, the last said means also serving to bias the latch longitudinally in a direction corresponding to forward rotation of the spindle, a brake for stopping the reverse rotation of the spindle, and means effective upon the engagement of the tooth with the end portion of the latch and upon the resultant longitudinal movement of the latch in opposition to its bias for applying the brake to stop the spindle in centered position.

64. In a machine for making a brush by twisting two closely adjacent longitudinal wires having between them a layer of transverse brush fibers with the ends of the fiber layer spaced from the ends of the wires, the combination of a headstock spindle rotatable about a longitudinal axis in a forward twisting direction and in a reverse direction which spindle has a predetermined centered position, a spindle control member rotatable with the spindle and having a single tooth facing in the reverse direction, a longitudinally movable tailstock slide, two wire engaging means carried respectively by the said spindle and the said slide, means for causing the two wire engaging means to simultaneously engage the wires, a reversible electric motor, an endless belt connecting the motor with the spindle for rotating it in the said forward direction to effect twisting and then in the said reverse direction, means automatically operable upon the completion of twisting for reversing the motor and for thus reversing the rotation of the spindle, a movable latch biased for engagement with the said spindle control member and yieldable to enable the tooth of the said member to move past the latch during forward rotation, a brake engageable with the belt for stopping the reverse rotation of the spindle and the motor, and means effective upon the engagement of the tooth with the latch during reverse rotation for applying the brake to stop the spindle in its said centered position.

References Cited in the file of this patent

UNITED STATES PATENTS

| | | |
|---|---|---|
| 2,234,641 | Baumgartner | Mar. 11, 1941 |
| 2,358,443 | Cave | Sept. 19, 1944 |
| 2,572,498 | Le Febvre | Oct. 23, 1951 |